United States Patent
Ma et al.

(10) Patent No.: US 10,783,613 B2
(45) Date of Patent: *Sep. 22, 2020

(54) CONTENT-BASED DETECTION AND THREE DIMENSIONAL GEOMETRIC RECONSTRUCTION OF OBJECTS IN IMAGE AND VIDEO DATA

(71) Applicant: Kofax, Inc., Irvine, CA (US)

(72) Inventors: Jiyong Ma, San Diego, CA (US); Stephen Michael Thompson, Oceanside, CA (US); Jan W. Amtrup, Silver Spring, MD (US)

(73) Assignee: KOFAX, INC., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/151,090

(22) Filed: Oct. 3, 2018

(65) Prior Publication Data

US 2019/0035061 A1 Jan. 31, 2019

Related U.S. Application Data

(63) Continuation of application No. 15/234,993, filed on Aug. 11, 2016, now Pat. No. 10,127,636, which is a (Continued)

(51) Int. Cl.
*G06K 9/00* (2006.01)
*G06T 5/00* (2006.01)
(Continued)

(52) U.S. Cl.
CPC .............. *G06T 5/002* (2013.01); *G01B 11/14* (2013.01); *G06K 9/4671* (2013.01); (Continued)

(58) Field of Classification Search
None
See application file for complete search history.

(56) References Cited

U.S. PATENT DOCUMENTS 5,764,813 A 6/1998 Murayama et al.
6,052,124 A * 4/2000 Stein ................ G06K 9/209
345/419

(Continued)

FOREIGN PATENT DOCUMENTS

EP 1146478 10/2001
EP 2388735 A2 11/2011

OTHER PUBLICATIONS

Extraction and integration—Images, Sung Chun Lee et al., IEEE, 1063-6919, 2004, pp. 1-8 (Year: 2004).*

(Continued)

*Primary Examiner* — Jayesh A Patel
(74) *Attorney, Agent, or Firm* — Zilka-Kotab, P.C.

(57) ABSTRACT

Systems, computer program products, and techniques for detecting and/or reconstructing objects depicted in digital image data within a three-dimensional space are disclosed, according to various exemplary embodiments. The inventive concepts uniquely utilize internal features to accomplish reconstruction, thereby avoiding reliance on reconstructing objects based on information derived from location of edges. The inventive concepts thus provide an improvement over conventional object reconstruction since objects may be detected and/or reconstructed even when edges are obscured or not depicted in the digital image data. In one aspect, reconstructing an object depicted in a digital image includes using a processor to: detect a plurality of identifying features of the object, where the identifying features are located internally with respect to the object; and reconstruct the digital image of the object within a three dimensional coordinate space based at least in part on some or all of the identifying features.

14 Claims, 8 Drawing Sheets

800

Detect a plurality of identifying features of an object depicted in a digital image, where the plurality of identifying features are located internally with respect to the object — 802

Reconstruct the digital image of the object within a three dimensional coordinate space based at least in part on some or all of the plurality of identifying features — 804

Related U.S. Application Data continuation-in-part of application No. 14/932,902, filed on Nov. 4, 2015, now Pat. No. 9,946,954, which is a continuation of application No. 14/491,901, filed on Sep. 19, 2014, now Pat. No. 9,208,536.

(60) Provisional application No. 62/317,360, filed on Apr. 1, 2016, provisional application No. 61/883,865, filed on Sep. 27, 2013.

(51) Int. Cl.
<br>  *G01B 11/14*    (2006.01)
<br>  *G06T 3/00*    (2006.01)
<br>  *G06K 9/46*    (2006.01)
<br>  *G06K 9/62*    (2006.01)
<br>  *G06T 7/50*    (2017.01)
<br>  *H04N 1/00*    (2006.01)

(52) U.S. Cl.
<br>  CPC .......... *G06K 9/6211* (2013.01); *G06T 3/00* (2013.01); *G06T 7/50* (2017.01); *H04N 1/00* (2013.01); *G06K 9/00483* (2013.01); *G06T 2207/30176* (2013.01)

(56) References Cited

U.S. PATENT DOCUMENTS

| | | | |
|---|---|---|---|
| 6,094,198 A * | 7/2000 | Shashua | G06T 15/10 345/419 |
| 6,278,798 B1 | 8/2001 | Rao | |
| 6,281,928 B1 | 8/2001 | Umezaki et al. | |
| 6,339,426 B1 | 1/2002 | Lui et al. | |
| 6,529,202 B2 | 3/2003 | Wu | |
| 6,647,139 B1 | 11/2003 | Kunii et al. | |
| 6,834,128 B1 | 12/2004 | Altunbasak et al. | |
| 7,031,496 B2 | 4/2006 | Shimano et al. | |
| 7,088,460 B2 | 8/2006 | Toyama et al. | |
| 7,160,253 B2 | 1/2007 | Nissila | |
| 7,606,439 B2 | 10/2009 | Lefebure et al. | |
| 7,695,143 B2 | 4/2010 | Kobayashi | |
| 7,746,356 B2 | 6/2010 | Meinders | |
| 7,809,587 B2 | 10/2010 | Dorai et al. | |
| 8,019,629 B1 | 9/2011 | Medina, III et al. | |
| 8,059,888 B2 * | 11/2011 | Chen | G06T 17/10 345/419 |
| 8,068,674 B2 | 11/2011 | Goncalves | |
| 8,155,425 B1 | 4/2012 | Mandel | |
| 8,228,323 B2 | 7/2012 | Bandel et al. | |
| 8,233,033 B2 | 7/2012 | Aarts et al. | |
| 8,553,984 B2 * | 10/2013 | Slotine | G06K 9/4671 382/103 |
| 8,681,150 B2 * | 3/2014 | Kim | G06K 9/00697 345/420 |
| 8,688,579 B1 | 4/2014 | Ethington et al. | |
| 8,718,405 B2 | 5/2014 | Fujiki et al. | |
| 8,755,779 B1 | 6/2014 | Burks et al. | |
| 8,918,357 B2 | 12/2014 | Minocha et al. | |
| 8,977,075 B2 | 3/2015 | Tytgat | |
| 9,053,515 B1 | 6/2015 | Nowak et al. | |
| 9,277,022 B2 | 3/2016 | Lee et al. | |
| 9,292,815 B2 | 3/2016 | Vibhor et al. | |
| 9,298,979 B2 * | 3/2016 | Nepomniachtchi | G06K 9/00442 |
| 9,430,766 B1 | 8/2016 | Kraft | |
| 9,436,921 B2 | 9/2016 | Whitmore | |
| 9,648,297 B1 * | 5/2017 | Ettinger | G06T 7/50 |
| 9,674,505 B2 | 6/2017 | Wu et al. | |
| 9,779,926 B2 * | 10/2017 | Van Berkel | H01J 49/167 |
| 9,817,081 B2 | 11/2017 | Hahn et al. | |
| 9,965,871 B1 | 5/2018 | Li et al. | |
| 9,978,024 B2 | 5/2018 | Ryan et al. | |
| 9,979,296 B2 | 5/2018 | Djenguerian et al. | |
| 10,049,291 B2 | 8/2018 | Nishikawa et al. | |
| 10,108,860 B2 | 10/2018 | Ma et al. | |
| 10,127,441 B2 | 11/2018 | Amtrup et al. | |
| 10,127,636 B2 * | 11/2018 | Ma | G06T 5/002 |
| 10,140,511 B2 | 11/2018 | Macciola et al. | |
| 10,146,795 B2 | 12/2018 | Macciola et al. | |
| 10,146,803 B2 | 12/2018 | Kilby et al. | |
| 10,157,331 B1 | 12/2018 | Tang et al. | |
| 10,242,285 B2 | 3/2019 | Thrasher et al. | |
| 10,354,159 B2 | 7/2019 | Savvides et al. | |
| 10,467,465 B2 | 11/2019 | Shustorovich et al. | |
| 10,515,407 B2 | 12/2019 | Amtrup et al. | |
| 10,635,712 B2 | 4/2020 | Macciola et al. | |
| 10,657,600 B2 | 5/2020 | Macciola et al. | |
| 10,664,919 B2 | 5/2020 | Macciola et al. | |
| 10,699,146 B2 | 6/2020 | Shustorovich | |
| 2001/0043273 A1 | 11/2001 | Herrod et al. | |
| 2002/0035488 A1 | 3/2002 | Aquila et al. | |
| 2002/0057838 A1 | 5/2002 | Steger | |
| 2002/0150241 A1 | 10/2002 | Scheidt et al. | |
| 2002/0188479 A1 | 12/2002 | Renwick et al. | |
| 2003/0108238 A1 | 6/2003 | Xu | |
| 2003/0138135 A1 | 7/2003 | Chung et al. | |
| 2003/0179294 A1 | 9/2003 | Martins | |
| 2004/0022439 A1 * | 2/2004 | Beardsley | G06K 9/00201 382/224 |
| 2004/0071311 A1 | 4/2004 | Choi et al. | |
| 2004/0114799 A1 | 6/2004 | Xu | |
| 2004/0125877 A1 | 7/2004 | Chang et al. | |
| 2004/0250205 A1 | 12/2004 | Conning | |
| 2004/0252190 A1 * | 12/2004 | Antonis | G01B 11/028 348/92 |
| 2005/0100210 A1 | 5/2005 | Rice et al. | |
| 2005/0163343 A1 * | 7/2005 | Kakinami | G06K 9/00812 382/103 |
| 2005/0243378 A1 | 11/2005 | Klein et al. | |
| 2005/0243379 A1 | 11/2005 | Klein et al. | |
| 2005/0244035 A1 | 11/2005 | Klein et al. | |
| 2006/0020630 A1 | 1/2006 | Stager et al. | |
| 2006/0045379 A1 | 3/2006 | Heaney et al. | |
| 2006/0061802 A1 | 3/2006 | Ogura | |
| 2006/0093998 A1 | 5/2006 | Vertegaal | |
| 2006/0210164 A1 | 9/2006 | Hideyuki | |
| 2006/0239539 A1 * | 10/2006 | Kochi | G06T 7/593 382/154 |
| 2007/0003165 A1 * | 1/2007 | Sibiryakov | G06K 9/6211 382/294 |
| 2007/0031028 A1 * | 2/2007 | Vetter | G06T 7/70 382/154 |
| 2007/0094296 A1 | 4/2007 | Peters | |
| 2007/0110417 A1 | 5/2007 | Itokawa | |
| 2007/0237425 A1 | 10/2007 | Taguchi et al. | |
| 2007/0260492 A1 | 11/2007 | Feied et al. | |
| 2008/0013836 A1 | 1/2008 | Nakamura et al. | |
| 2008/0031514 A1 | 2/2008 | Kakinami | |
| 2008/0052134 A1 | 2/2008 | Nowak et al. | |
| 2008/0177612 A1 | 7/2008 | Starink et al. | |
| 2008/0192991 A1 | 8/2008 | Gremse et al. | |
| 2008/0211809 A1 * | 9/2008 | Kim | G06K 9/00697 345/420 |
| 2008/0225127 A1 * | 9/2008 | Ming | H04N 5/2628 348/208.99 |
| 2008/0232715 A1 * | 9/2008 | Miyakawa | G06T 7/33 382/284 |
| 2009/0041330 A1 | 2/2009 | Journey et al. | |
| 2009/0043782 A1 | 2/2009 | Otake et al. | |
| 2009/0080738 A1 | 3/2009 | Zur et al. | |
| 2009/0110267 A1 * | 4/2009 | Zakhor | G06T 15/04 382/154 |
| 2009/0185738 A1 * | 7/2009 | Nepomniachtchi | G06K 9/00442 382/140 |
| 2009/0263025 A1 | 10/2009 | Li et al. | |
| 2009/0265193 A1 | 10/2009 | Collins et al. | |
| 2010/0038839 A1 | 2/2010 | DeWitt et al. | |
| 2010/0045701 A1 * | 2/2010 | Scott | H04N 7/183 345/633 |
| 2010/0174564 A1 | 7/2010 | Stender et al. | |
| 2010/0189367 A1 | 7/2010 | van der Merwe et al. | |

(56) References Cited

U.S. PATENT DOCUMENTS

| | | | |
|---|---|---|---|
| 2010/0214291 A1* | 8/2010 | Muller | G06T 17/10 |
| | | | 345/420 |
| 2010/0289797 A1 | 11/2010 | Tateno et al. | |
| 2011/0025825 A1* | 2/2011 | McNamer | H04N 13/221 |
| | | | 348/46 |
| 2011/0116684 A1 | 5/2011 | Coffman et al. | |
| 2011/0123120 A1 | 5/2011 | Quack | |
| 2011/0128360 A1 | 6/2011 | Hatzav et al. | |
| 2011/0142341 A1 | 6/2011 | Dolan et al. | |
| 2011/0178708 A1 | 7/2011 | Zhang | |
| 2011/0179289 A1 | 7/2011 | Guenther | |
| 2011/0181589 A1* | 7/2011 | Quan | G06T 17/05 |
| | | | 345/420 |
| 2011/0254942 A1 | 10/2011 | Suzuki | |
| 2011/0312374 A1 | 12/2011 | Chen et al. | |
| 2012/0002057 A1 | 1/2012 | Kakinami | |
| 2012/0051628 A1 | 3/2012 | Noguchi et al. | |
| 2012/0070088 A1 | 3/2012 | Yoshimi | |
| 2012/0076420 A1 | 3/2012 | Kono et al. | |
| 2012/0084277 A1 | 4/2012 | Barve et al. | |
| 2012/0087552 A1 | 4/2012 | Lee | |
| 2012/0170829 A1 | 7/2012 | Jackson et al. | |
| 2012/0274991 A1 | 11/2012 | Roy et al. | |
| 2012/0284185 A1* | 11/2012 | Mettler | G06Q 20/3276 |
| | | | 705/44 |
| 2012/0301011 A1* | 11/2012 | Grzechnik | G06T 19/006 |
| | | | 382/154 |
| 2013/0004076 A1* | 1/2013 | Koo | G06K 9/325 |
| | | | 382/176 |
| 2013/0044186 A1 | 2/2013 | Jin et al. | |
| 2013/0063788 A1 | 3/2013 | Iwayama et al. | |
| 2013/0120595 A1 | 5/2013 | Roach et al. | |
| 2013/0155058 A1 | 6/2013 | Golparvar-Fard et al. | |
| 2013/0215480 A1 | 8/2013 | Iwayama et al. | |
| 2013/0223721 A1 | 8/2013 | Nepomniachtchi et al. | |
| 2013/0272607 A1 | 10/2013 | Chattopadhyay et al. | |
| 2013/0287265 A1* | 10/2013 | Nepomniachtchi | G06K 9/3275 |
| | | | 382/115 |
| 2013/0294652 A1 | 11/2013 | Fan et al. | |
| 2014/0003717 A1 | 1/2014 | Brito et al. | |
| 2014/0020005 A1 | 1/2014 | Amselem et al. | |
| 2014/0047367 A1* | 2/2014 | Nielsen | G06F 3/0484 |
| | | | 715/767 |
| 2014/0050367 A1 | 2/2014 | Chen et al. | |
| 2014/0072201 A1 | 3/2014 | Tilt | |
| 2014/0072219 A1 | 3/2014 | Tian | |
| 2014/0093177 A1 | 4/2014 | Hayashi et al. | |
| 2014/0237429 A1 | 8/2014 | Abrahami et al. | |
| 2014/0324648 A1 | 10/2014 | Mod et al. | |
| 2015/0086080 A1* | 3/2015 | Stein | H04N 7/183 |
| | | | 382/104 |
| 2015/0146989 A1 | 5/2015 | Shiiyama et al. | |
| 2015/0281949 A1 | 10/2015 | LaBorde | |
| 2015/0317529 A1* | 11/2015 | Zhou | G06K 9/18 |
| | | | 382/190 |
| 2016/0210507 A1 | 7/2016 | Abdollahian | |
| 2016/0227181 A1 | 8/2016 | Ilic et al. | |
| 2017/0147900 A1 | 5/2017 | Booth | |
| 2017/0300786 A1 | 10/2017 | Gope et al. | |
| 2019/0034456 A1 | 1/2019 | Macciola et al. | |
| 2019/0087942 A1 | 3/2019 | Ma et al. | |
| 2019/0164010 A1 | 5/2019 | Ma et al. | |
| 2019/0164313 A1 | 5/2019 | Ma et al. | |
| 2019/0171900 A1 | 6/2019 | Thrasher et al. | |
| 2020/0005035 A1 | 1/2020 | Shustorovich et al. | |
| 2020/0219202 A1 | 7/2020 | Macciola et al. | |

OTHER PUBLICATIONS

Object Recognition—Imaging, Wang et al., ICSP2008 Proceedings, 2008, pp. 810-813 (Year: 2008).*

Notice of Allowance from U.S. Appl. No. 14/829,474, dated Oct. 1, 2018.

Abiteboul et al., "Collaborative Data-Driven Workflows: Think Global, Act Local," ACM, PODS, Jun. 2013, pp. 91-102.

Chen et al., "A Model Driven Visualization Platform for Workflow," ACM, VINCI, Sep. 2010, 6 pages.

Corrected Notice of Allowance from U.S. Appl. No. 15/396,322, dated Oct. 16, 2018.

Corrected Notice of Allowance from U.S. Appl. No. 15/385,707, dated Oct. 16, 2018.

Notice of Allowance from U.S. Appl. No. 15/214,351, dated Nov. 6, 2018.

Ma et al., U.S. Appl. No. 16/194,201, filed Nov. 16, 2018.

Thrasher et al., U.S. Appl. No. 16/267,205, filed Feb. 04, 2019.

Extended European Search Report from European Application No. 16828499.0, dated Jan. 2, 2019.

Non-Final Office Action from U.S. Appl. No. 15/396,327, dated Mar. 8, 2019.

Non-Final Office Action from U.S. Appl. No. 16/052,495, dated Mar. 18, 2019.

Ma et al., U.S. Appl. No. 16/206,912, filed Nov. 30, 2018.

Ma et al., U.S. Appl. No. 16/206,926, filed Nov. 30, 2018.

Non-Final Office Action from U.S. Appl. No. 15/394,739, dated Jun. 17, 2019.

Notice of Allowance from U.S. Appl. No. 15/396,327, dated Jun. 21, 2019.

Examination Report from European Application No. 14 847 9223, dated Apr. 24, 2019.

Non-Final Office Action from U.S. Appl. No. 15/672,200, dated Jun. 26, 2019.

Notice of Allowance from U.S. Appl. No. 16/052,495, dated Dec. 18, 2019.

Notice of Allowance from U.S. Appl. No. 15/394,726, dated Jan. 8, 2020.

Notice of Allowance from U.S. Appl. No. 15/339,789, dated Jan. 16, 2020.

Non-Final Office Action from U.S. Appl. No. 15/394,726, dated Mar. 28, 2019.

Non-Final Office Action from U.S. Appl. No. 15/339,789, dated Apr. 15, 2019.

Non-Final Office Action from U.S. Appl. No. 15/396,306, dated Apr. 18, 2019.

Restriction Requirement from U.S. Appl. No. 15/672,200, dated Mar. 29, 2019.

Final Office Action from U.S. Appl. No. 15/394,726, dated Oct. 11, 2019.

Non-Final Office Action from U.S. Appl. No. 16/267,205, dated Oct. 17, 2019.

Final Office Action from U.S. Appl. No. 15/396,306, dated Sep. 17, 2019.

Notice of Allowance from U.S. Appl. No. 15/396,327, dated Sep. 24, 2019.

Non-Final Office Action from U.S. Appl. No. 15/051,587, dated Jul. 31, 2019.

Corrected Notice of Allowance from U.S. Appl. No. 15/396,327, dated Aug. 28, 2019.

Examination Report from European Application No. 14 792 188.6, dated Aug. 20, 2019.

Non-Final Office Action from U.S. Appl. No. 15/394,731, dated Sep. 5, 2019.

Final Office Action from U.S. Appl. No. 16/052,495, dated Sep. 11, 2019.

Final Office Action from U.S. Appl. No. 15/051,587, dated Jan. 27, 2020.

Non-Final Office Action from U.S. Appl. No. 16/194,201, dated Feb. 3, 2020.

Pinto et al., "Why is real-World Visual Object Recognition Hard?" PLoS Computational Biology, Jan. 2008, vol. 4, No. 1, pp. 0151-0156.

Lowe, D., "Object Recognition from Local Scale-Invariant Features," Proceedings of the International Conference on computer Vision, Sep. 1999, pp. 1-8.

Final Office Action from U.S. Appl. No. 15/394,731, dated Feb. 12, 2020.

(56) References Cited

OTHER PUBLICATIONS

Non-Final Office Action from U.S. Appl. No. 15/672,200, dated Feb. 21, 2020.
Final Office Action from U.S. Appl. No. 16/267,205, dated Feb. 24, 2020.
Examination Report from European Application No. 14861942.2, dated Oct. 1, 2019.
Notice of Allowance from U.S. Appl. No. 16/052,495, dated Mar. 18, 2020.
Macciola et al., U.S. Appl. No. 16/824,518, filed Mar. 19, 2020.
Notice of Allowance from U.S. Appl. No. 15/339,789, dated Apr. 7, 2020.
Notice of Allowance from U.S. Appl. No. 15/394,726, dated Apr. 16, 2020.
Notice of Allowance from U.S. Appl. No. 15/672,200, dated Apr. 17, 2020.
Advisory Action from Appl. No. 15/051,587, dated Apr. 29, 2020.
Final Office Action from U.S. Appl. No. 15/339,789, dated Oct. 28, 2019.
Notice of Allowance from U.S. Appl. No. 15/394,739, dated Oct. 31, 2019.
Final Office Action from U.S. Appl. No. 15/672,200, dated Oct. 24, 2019.
Examiner's Answer to Appeal Brief from U.S. Appl. No. 15/396,306, dated May 15, 2020.
Notice of Allowance from U.S. Appl. No. 16/194,201, dated May 19, 2020.
Notice of Allowance from U.S. Appl. No. 16/206,926, dated May 21, 2020.
Non-Final Office Action from U.S. Appl. No. 15/394,731, dated May 29, 2020.
Notice of Allowance from U.S. Appl. No. 16/267,205, dated Jun. 19, 2020.

\* cited by examiner

700

702 Detect a plurality of identifying features of an object depicted in a digital image, where the plurality of identifying features are located internally with respect to the object

704 Project a location of one or more edges of the object based at least in part on the plurality of identifying features

802 Detect a plurality of identifying features of an object depicted in a digital image, where the plurality of identifying features are located internally with respect to the object

804 Reconstruct the digital image of the object within a three dimensional coordinate space based at least in part on some or all of the plurality of identifying features

FIG. 8

CONTENT-BASED DETECTION AND THREE DIMENSIONAL GEOMETRIC RECONSTRUCTION OF OBJECTS IN IMAGE AND VIDEO DATA

FIELD OF INVENTION

The present invention relates to digital image data capture and processing, and more particularly to detecting objects depicted in image and/or video data based on internally-represented features (content) as opposed to edges. The present invention also relates to reconstructing objects in a three-dimensional coordinate space so as to rectify image artifacts caused by distortional effects inherent to capturing image and/or video data using a camera.

BACKGROUND OF THE INVENTION

Digital images having depicted therein a document such as a letter, a check, a bill, an invoice, a credit card, a driver license, a passport, a social security card, etc. have conventionally been captured and processed using a scanner or multifunction peripheral coupled to a computer workstation such as a laptop or desktop computer. Methods and systems capable of performing such capture and processing are well known in the art and well adapted to the tasks for which they are employed.

However, in an era where day-to-day activities, computing, and business are increasingly performed using mobile devices, it would be greatly beneficial to provide analogous document capture and processing systems and methods for deployment and use on mobile platforms, such as smart phones, digital cameras, tablet computers, etc.

A major challenge in transitioning conventional document capture and processing techniques is the limited processing power and image resolution achievable using hardware currently available in mobile devices. These limitations present a significant challenge because it is impossible or impractical to process images captured at resolutions typically much lower than achievable by a conventional scanner. As a result, conventional scanner-based processing algorithms typically perform poorly on digital images captured using a mobile device.

In addition, the limited processing and memory available on mobile devices makes conventional image processing algorithms employed for scanners prohibitively expensive in terms of computational cost. Attempting to process a conventional scanner-based image processing algorithm takes far too much time to be a practical application on modern mobile platforms.

A still further challenge is presented by the nature of mobile capture components (e.g. cameras on mobile phones, tablets, etc.). Where conventional scanners are capable of faithfully representing the physical document in a digital image, critically maintaining aspect ratio, dimensions, and shape of the physical document in the digital image, mobile capture components are frequently incapable of producing such results.

Specifically, images of documents captured by a camera present a new line of processing issues not encountered when dealing with images captured by a scanner. This is in part due to the inherent differences in the way the document image is acquired, as well as the way the devices are constructed. The way that some scanners work is to use a transport mechanism that creates a relative movement between paper and a linear array of sensors. These sensors create pixel values of the document as it moves by, and the sequence of these captured pixel values forms an image. Accordingly, there is generally a horizontal or vertical consistency up to the noise in the sensor itself, and it is the same sensor that provides all the pixels in the line.

In contrast, cameras have many more sensors in a non-linear array, e.g., typically arranged in a rectangle. Thus, all of these individual sensors are independent, and render image data that is not typically of horizontal or vertical consistency. In addition, cameras introduce a projective effect that is a function of the angle at which the picture is taken. For example, with a linear array like in a scanner, even if the transport of the paper is not perfectly orthogonal to the alignment of sensors and some skew is introduced, there is no projective effect like in a camera. Additionally, with camera capture, nonlinear distortions may be introduced because of the camera optics.

Distortions and blur are particularly challenging when attempting to detect objects represented in video data, as the camera typically moves with respect to the object during the capture operation, and video data are typically characterized by a relatively low resolution compared to still images captured using a mobile device. Moreover, the motion of the camera may be erratic and occur within three dimensions, meaning the horizontal and/or vertical consistency associated with linear motion in a conventional scanner is not present in video data captured using mobile devices. Accordingly, reconstructing an object to correct for distortions, e.g. due to changing camera angle and/or position, within a three-dimensional space is a significant challenge.

Further still, as mobile applications increasingly rely on or leverage image data to provide useful services to customers, e.g. mobile banking, shopping, applying for services such as loans, opening accounts, authenticating identity, acquiring or renewing licenses, etc., capturing relevant information within image data is a desirable capability. However, often the detection of objects within the mobile image data is a challenging task, particularly where the object's edges may be missing, obscured, etc. within the captured image/video data. Since conventional detection techniques rely on detecting objects by locating edges of the object (i.e. boundaries between the object, typically referred to as the image "foreground" and the background of the image or video), missing or obscured object edges present an additional obstacle to consistent and accurate object detection.

In view of the challenges presented above, it would be beneficial to provide an image capture and processing algorithm and applications thereof that compensate for and/or correct problems associated with using a mobile device to capture and/or detect objects within image and/or video data, and reconstruct such objects within a three-dimensional coordinate space.

SUMMARY OF THE INVENTION

According to one embodiment, a computer program product for reconstructing an object depicted in a digital image includes a computer readable medium having stored thereon computer readable program instructions configured to cause a hardware processor, upon execution thereof, to: detect a plurality of identifying features of the object, wherein the plurality of identifying features are located internally with respect to the object; and reconstruct the digital image of the object within a three dimensional coordinate space based at least in part on some or all of the plurality of identifying features.

According to another embodiment, a computer program product for detecting a financial instrument depicted in a digital image, comprising a computer readable medium having stored thereon computer readable program instructions configured to cause a hardware processor, upon execution thereof, to: detect, using the hardware processor, a plurality of identifying features of the financial instrument, wherein the plurality of identifying features are located internally with respect to the financial instrument; project, using the hardware processor, a location of one or more edges of the financial instrument based at least in part on the plurality of identifying features; and output, at least in part based on the projected location of the one or more edges of the financial instrument to a display of a computer, and/or a memory. Notably, the financial instrument is a check.

According to yet another embodiment, a computer program product for detecting a object depicted in a digital image, comprising a computer readable medium having stored thereon computer readable program instructions configured to cause a hardware processor, upon execution thereof, to: detect, using the hardware processor, a plurality of identifying features of the object, wherein the plurality of identifying features are located internally with respect to the object; project, using the hardware processor, a location of one or more edges of the object based at least in part on the plurality of identifying features; and output, at least in part based on the projected location of the one or more edges of the object to a display of a computer, and/or a memory.

Other aspects and embodiments of the invention will be appreciated based on reviewing the following descriptions in full detail.

BRIEF DESCRIPTION OF THE DRAWINGS

FIG. 7 is a flowchart of a method for detecting objects depicted in digital images based on internal features of the object, according to one embodiment.

FIG. 8 is a flowchart of a method for reconstructing objects depicted in digital images based on internal features of the object, according to one embodiment.

DETAILED DESCRIPTION

Figure 1:
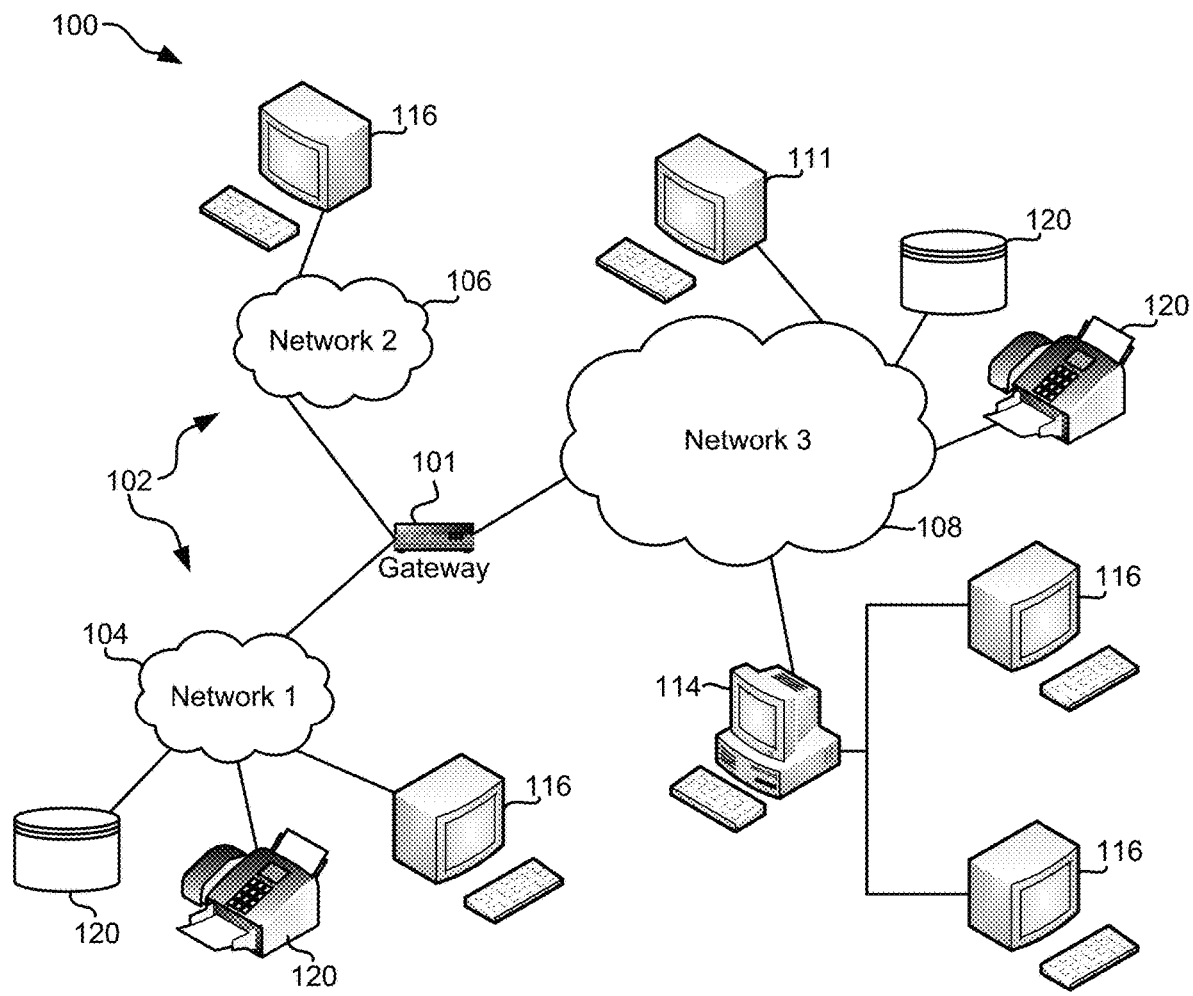
FIG. 1 illustrates a network architecture, in accordance with one embodiment.

The following description is intended to illustrate the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The present application refers to image processing. In particular, the present application discloses systems, methods, and computer program products configured to detect and reconstruct objects depicted in digital images from a non-rectangular shape to a substantially rectangular shape, or preferably a rectangular shape. Even more preferably, this is accomplished based on evaluating the internal features of the object(s) rather than detecting object edges and reconstructing a particular shape based on edge contours.

According to one embodiment, a computer-implemented method of reconstructing an object depicted in a digital image includes: detecting a plurality of identifying features of the object, wherein the plurality of identifying features are located internally with respect to the object; and reconstructing the digital image of the object within a three dimensional coordinate space based at least in part on some or all of the plurality of identifying features.

According to another embodiment, a computer program product for reconstructing an object depicted in a digital image includes a computer readable medium having stored thereon computer readable program instructions configured to cause a processor, upon execution thereof, to: detect, using the processor, a plurality of identifying features of the object, wherein the plurality of identifying features are located internally with respect to the object; and reconstruct, using the processor, the digital image of the object within a three dimensional coordinate space based at least in part on some or all of the plurality of identifying features.

According to yet another embodiment, a system for reconstructing an object depicted in a digital image includes a processor and logic embodied with and/or executable by the processor. The logic is configured to cause the processor, upon execution thereof, to: detect a plurality of identifying features of the object, wherein the plurality of identifying features are located internally with respect to the object; and reconstruct the digital image of the object within a three dimensional coordinate space based at least in part on some or all of the plurality of identifying features.

The following definitions will be useful in understanding the inventive concepts described herein, according to various embodiments. The following definitions are to be considered exemplary, and are offered for purposes of illustration to provide additional clarity to the present disclosures, but should not be deemed limiting on the scope of the inventive concepts disclosed herein.

Figure 6A:
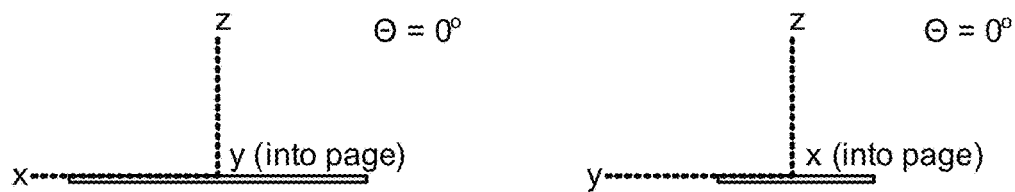
FIG. 6A is a simplified schematic showing a coordinate system for measuring capture angle, according to one embodiment.
Figure 6B:
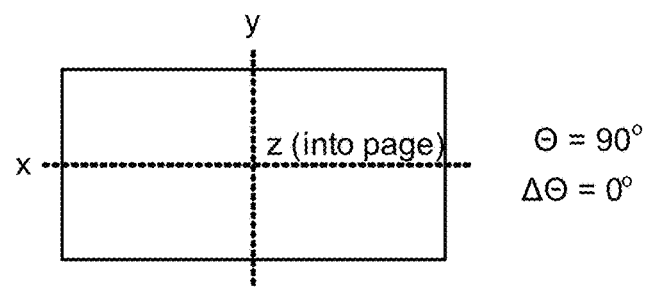
FIG. 6B depicts an exemplary schematic of a rectangular object captured using a capture angle normal to the object, according to one embodiment.
Figure 6C:
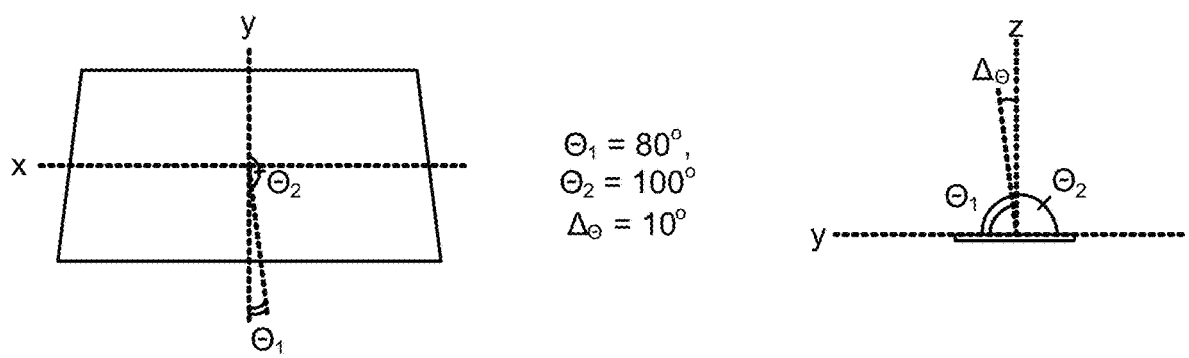
FIG. 6C depicts an exemplary schematic of a rectangular object captured using a capture angle slightly skewed with respect to the object, according to one embodiment.
Figure 6D:
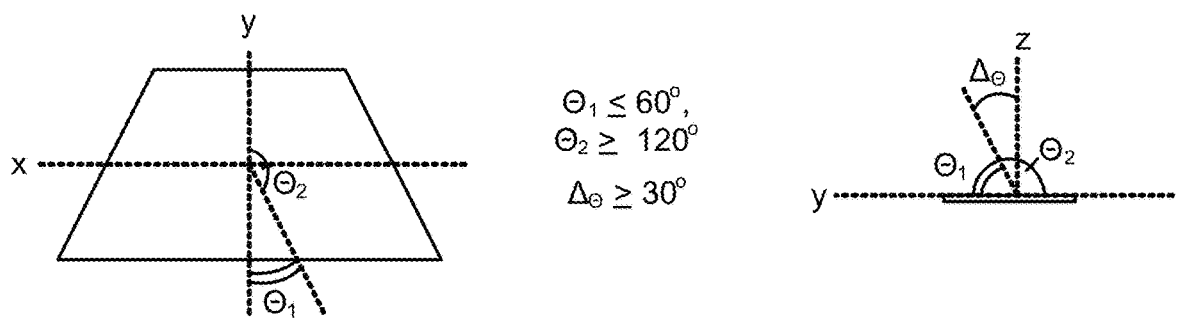
FIG. 6D depicts an exemplary schematic of a rectangular object captured using a capture angle significantly skewed with respect to the object, according to one embodiment.

As referred to henceforth, a "quadrilateral" is a four-sided figure where (1) each side is linear, and (2) adjacent sides form vertices at the intersection thereof. Exemplary quadrilaterals are depicted in FIGS. 6C and 6D below, according to two illustrative embodiments.

A "parallelogram" is a special type of quadrilateral, i.e. a four-sided figure where (1) each side is linear, (2) opposite sides are parallel, and (3) adjacent sides are not necessarily perpendicular, such that vertices at the intersection of adjacent sides form angles having values that are not necessarily 90°.

A "rectangle" or "rectangular shape" is a special type of quadrilateral, which is defined as a four-sided figure, where (1) each side is linear, (2) opposite sides are parallel, and (3) adjacent sides are perpendicular, such that an interior angle formed at the vertex between each pair of adjacent sides is a right-angle, i.e. a 90° angle. An exemplary rectangle is depicted in FIG. 6B, according to one illustrative embodiment.

Moreover, as referred-to herein "rectangles" and "rectangular shapes" are considered to include "substantially rectangular shapes", which are defined as a four-sided shape where (1) each side is predominantly linear (e.g. at least 90%, 95%, or 99% of each side's length, in various embodiments, is characterized by a first-order polynomial (such as y=mx+b), (2) each pair of adjacent sides form an interior angle having a value θ, where θ is approximately 90° (e.g. θ satisfies the relationship: 85°≤θ≤95°)) at either (a) a vertex between two adjacent sides, (b) a vertex between a projection of the predominantly linear portion of one side and an adjacent side, or (c) a vertex between a projection of the predominantly linear portion of one side and a projection of the predominantly linear portion of an adjacent side.

A "non-rectangular shape" as referred to herein includes any shape that is not either a "rectangular shape" or a "substantially rectangular shape" as defined above. In preferred embodiments, a "non-rectangular shape" is a "tetragon," which as referred to herein is a four-sided figure, where: (1) each side is characterized in whole or in part by an equation selected from a chosen class of functions (e.g. selected from a class of polynomials preferably ranging from zeroth order to fifth order, more preferably first order to third order polynomials, and even more preferably first order to second order polynomials), and (2) adjacent sides of the figure form vertices at the intersection thereof.

Images (e.g. pictures, figures, graphical schematics, single frames of movies, videos, films, clips, etc.) are preferably digital images captured by cameras, especially cameras of mobile devices. As understood herein, a mobile device is any device capable of receiving data without having power supplied via a physical connection (e.g. wire, cord, cable, etc.) and capable of receiving data without a physical data connection (e.g. wire, cord, cable, etc.). Mobile devices within the scope of the present disclosures include exemplary devices such as a mobile telephone, smartphone, tablet, personal digital assistant, iPod®, iPad®, BLACKBERRY® device, etc.

However, as it will become apparent from the descriptions of various functionalities, the presently disclosed mobile image processing algorithms can be applied, sometimes with certain modifications, to images coming from scanners and multifunction peripherals (MFPs). Similarly, images processed using the presently disclosed processing algorithms may be further processed using conventional scanner processing algorithms, in some approaches.

Of course, the various embodiments set forth herein may be implemented utilizing hardware, software, or any desired combination thereof. For that matter, any type of logic may be utilized which is capable of implementing the various functionality set forth herein.

One benefit of using a mobile device is that with a data plan, image processing and information processing based on captured images can be done in a much more convenient, streamlined and integrated way than previous methods that relied on presence of a scanner. However, the use of mobile devices as document(s) capture and/or processing devices has heretofore been considered unfeasible for a variety of reasons.

In one approach, an image may be captured by a camera of a mobile device. The term "camera" should be broadly interpreted to include any type of device capable of capturing an image of a physical object external to the device, such as a piece of paper. The term "camera" does not encompass a peripheral scanner or multifunction device. Any type of camera may be used. Preferred embodiments may use cameras having a higher resolution, e.g. 8 MP or more, ideally 12 MP or more. The image may be captured in color, grayscale, black and white, or with any other known optical effect. The term "image" as referred to herein is meant to encompass any type of data corresponding to the output of the camera, including raw data, processed data, etc.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

General Computing and Networking Concepts

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

Figure 2:
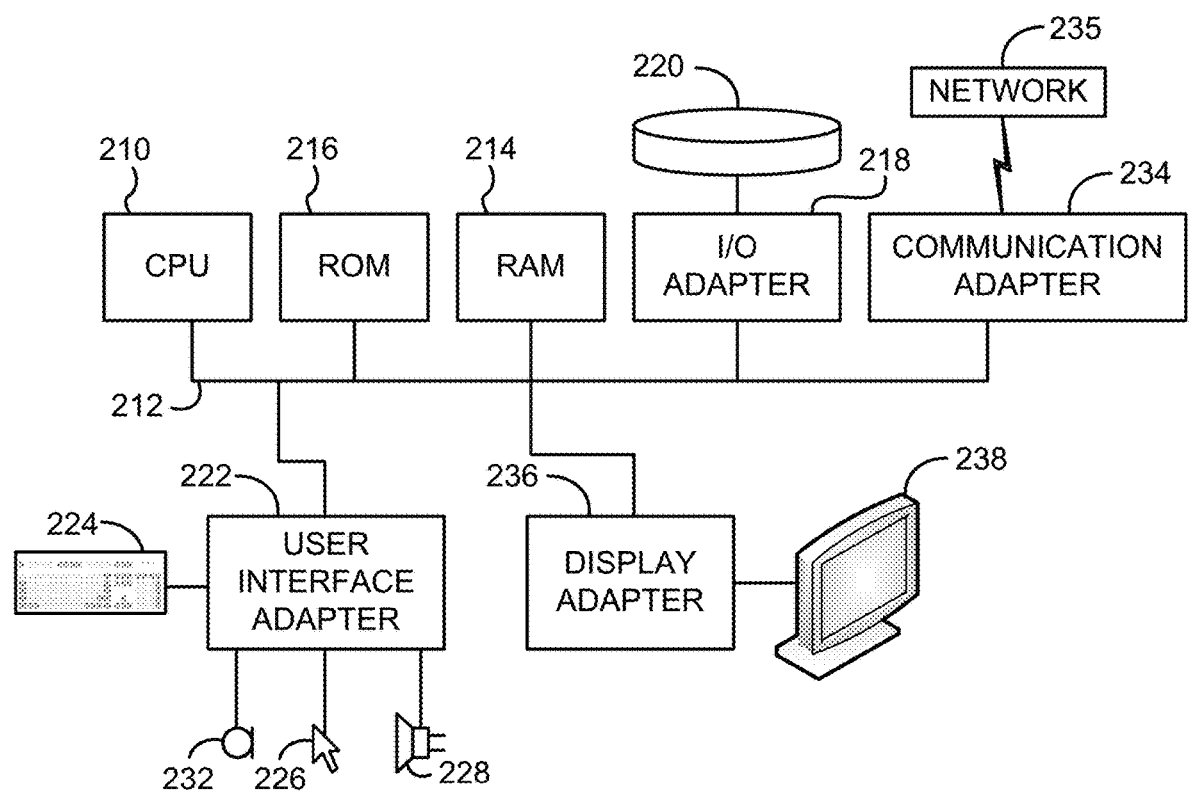
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Mobile Image Capture

Various embodiments of a Mobile Image Capture and Processing algorithm, as well as several mobile applications configured to facilitate use of such algorithmic processing within the scope of the present disclosures are described below. It is to be appreciated that each section below describes functionalities that may be employed in any combination with those disclosed in other sections, including any or up to all the functionalities described herein. Moreover, functionalities of the processing algorithm embodiments as well as the mobile application embodiments may be combined and/or distributed in any manner across a variety of computing resources and/or systems, in several approaches.

An application may be installed on the mobile device, e.g., stored in a nonvolatile memory of the device. In one approach, the application includes instructions to perform processing of an image on the mobile device. In another approach, the application includes instructions to send the image to one or more non-mobile devices, e.g. a remote server such as a network server, a remote workstation, a cloud computing environment, etc. as would be understood by one having ordinary skill in the art upon reading the present descriptions. In yet another approach, the application may include instructions to decide whether to perform some or all processing on the mobile device and/or send the image to the remote site. Examples of how an image may be processed are presented in more detail below.

In one embodiment, there may be no difference between the processing that may be performed on the mobile device and a remote server, other than speed of processing, constraints on memory available, etc. Moreover, there may be some or no difference between various user interfaces presented on a mobile device, e.g. as part of a mobile application, and corresponding user interfaces presented on a display in communication with the non-mobile device.

In other embodiments, a remote server may have higher processing power, more capabilities, more processing algorithms, etc. In yet further embodiments, the mobile device may have no image processing capability associated with the application, other than that required to send the image to the remote server. In yet another embodiment, the remote server may have no image processing capability relevant to the platforms presented herein, other than that required to receive the processed image from the remote server. Accordingly, the image may be processed partially or entirely on the mobile device, and/or partially or entirely on a remote server, and/or partially or entirely in a cloud, and/or partially or entirely in any part of the overall architecture in between. Moreover, some processing steps may be duplicated on different devices.

Which device performs which parts of the processing may be defined by a user, may be predetermined, may be determined on the fly, etc. Moreover, some processing steps may be re-performed, e.g., upon receiving a request from the user. Accordingly, the raw image data, partially processed image data, or fully processed image data may be transmitted from the mobile device, e.g., using a wireless data network, to a remote system. Image data as processed at a remote system may be returned to the mobile device for output and/or further processing.

In a further approach, the image may be partitioned, and the processing of the various parts may be allocated to various devices, e.g., ½ to the mobile device and ½ to the remote server, after which the processed halves are combined.

In one embodiment, selection of which device performs the processing may be based at least in part on a relative speed of processing locally on the mobile device vs. communication with the server.

In one approach, a library of processing functions may be present, and the application on the mobile device or the application on a remote server simply makes calls to this library, and essentially the meaning of the calls defines what kind of processing to perform. The device then performs that processing and outputs the processed image, perhaps with some corresponding metadata.

Any type of image processing known in the art and/or as newly presented herein may be performed in any combination in various embodiments.

Referring now to illustrative image processing, the camera can be considered an area sensor that captures images, where the images may have any number of projective effects, and sometimes non-linear effects. The image may be processed to correct for such effects. Moreover, the position and boundaries of the document(s) in the image may be found during the processing, e.g., the boundaries of one or more actual pages of paper in the background surrounding the page(s). Because of the mobile nature of various embodiments, the sheet of paper may be lying on just about anything. This complicates image analysis in comparison to processing images of documents produced using a scanner, because scanner background properties are constant and typically known, whereas mobile capture backgrounds may vary almost infinitely according to the location of the document and the corresponding surrounding textures captured in the image background, as well as because of variable lighting conditions.

Accordingly, the non-uniformity of the background of the surface on which the piece of paper may be positioned for capture by the camera presents one challenge, and the non-linear and projective effects present additional challenges. Various embodiments overcome these challenges, as will soon become apparent.

In one exemplary mode of operation, an application on the mobile device may be initiated, e.g., in response to a user request to open the application. For example, a user-selection of an icon representing the application may be detected.

In some approaches, a user authentication may be requested and/or performed. For example, a user ID and password, or any other authentication information, may be requested and/or received from the user.

In further approaches, various tasks may be enabled via a graphical user interface of the application. For example, a list of tasks may be presented. In such case, a selection of one of the tasks by the user may be detected, and additional options may be presented to the user, a predefined task may be initiated, the camera may be initiated, etc.

Content-Based Object Detection

An image may be captured by the camera of the mobile device, preferably upon receiving some type of user input such as detecting a tap on a screen of the mobile device, depression of a button on the mobile device, a voice command, a gesture, etc. Another possible scenario may involve some level of analysis of sequential frames, e.g. from a video stream. Sequential frame analysis may be followed by a switch to capturing a single high-resolution image frame, which may be triggered automatically or by a user, in some approaches. Moreover, the trigger may be based on information received from one or more mobile device sensors. For example, in one embodiment an accelerometer in or coupled to the mobile device may indicate a stability of the camera, and the application may analyze low-resolution video frame(s) for presence of an object of interest. If an object is detected, the application may perform a focusing operation and acquire a high-resolution image of the detected object. Either the low- or high-resolution image may be further processed, but preferred embodiments utilize the high-resolution image for subsequent processing.

In more approaches, switching to single frame mode as discussed above may be unnecessary, particularly for smaller objects, in particular documents such as business cards, receipts, credit cards, identification documents such as driver licenses and passports, etc. To increase processing rate and reduce consumption of processing resources, object type identification may facilitate determining whether or not to switch to single frame mode and/or capture a high-resolution image for processing.

As noted above, conventional techniques for detecting objects in image and/or video data generally rely on detecting the edges of the object, i.e. transitions between the background and foreground (which depicts the object) of the image or video data. For instance, edges may be detected based on locating one or more lines (e.g. four lines intersecting to form corners of a substantially rectangular object such as a document) of pixels characterized by a sharp transition in pixel intensity between the background and foreground.

However, where edges are missing or obscured, the conventional edge detection approach is not reasonably accurate or consistent in detecting objects within image and/or video data. Similar challenges exist in images where the object for which detection is desired is set against a complex background (e.g. a photograph or environmental scene) since detecting sharp transitions in intensity is likely to generate many false positive predictions of the location of the object. Accordingly, a new approach is presented via the inventive concepts disclosed herein, and this inventive approach advantageously does not rely on detecting object edges to accomplish object detection within the image and/or video data.

In particular, the presently disclosed inventive concepts include using features of the object other than the edges, e.g. content depicted within a document, to serve as identifying characteristics from which object detection may be accomplished. While the present descriptions set forth several exemplary embodiments of object detection primarily with reference to features of documents, it should be understood that these concepts are equally applicable to nearly any type of object, and the techniques discussed herein may be utilized to detect nearly any type of object for which a suitable set of identifying features are present across various exemplars of that object type.

Turning now to exemplary embodiments in which the detected object is a document, e.g. a form, a passport, a driver license, a credit card, a business card, a check, a receipt etc., and consistent with the notion that identifying features should be present across various (preferably all) exemplars of a particular document type, content that is common to documents of that type may serve as a suitable identifying feature. In some approaches, edges of the detected object may be cut off, obscured, or otherwise not identifiable within the image. Indeed, the presently disclosed inventive concepts offer the particular advantage that detection of objects may be accomplished independent of whether object edges are identifiable within the image data. Accordingly, the presently disclosed inventive concepts effectuate an improvement to systems configured for object recognition/detection within image data.

In some approaches, when the object or document is known to depict particular content in a particular location, e.g. a barcode, MICR characters for a check, MRZ characters on passports and certain types of identifying documents, etc., then these reference content may be employed to facilitate detecting the object within image and/or video data. In many cases, reference content position and/or content is defined by some sort of standard. In various embodiments, it is accordingly advantageous to leverage a priori knowledge regarding the location, size, orientation, etc. of reference content within an image to project the location of document edges based on the reference content as depicted in the image and/or video data.

However, not all objects include such reference content. Accordingly, in more embodiments, content such as internal lines, symbols (e.g. small images like icons which preferably contain rich texture information, for instance, for a fingerprint, the ridge pattern, especially, the cross points of two lines, etc.), text characters, etc. which appears on substantially all documents of a particular type is eligible for use as an identifying feature. According to the present descriptions, such content may also be referred to as "boilerplate content."

Boilerplate content may be determined manually, e.g. based on a user defining particular feature zones within a reference image, in some approaches. For instance, a user may define particular regions such as those designated in FIG. 3A by dashed-line bounding boxes. In a particularly preferred approach, the particular regions defined by the user may include a subset of the regions shown in FIG. 3A, most preferably those regions exhibiting a shading within the bounding box (e.g. for a California driver license, state name "CALIFORNIA," expiration date "EXP," first name "FN," last name "LN," date of birth "DOB," sex "SEX," height "HGT," eye color "EYES," weight "WGT," and document discriminator "DD" field designators). In various approaches, the feature zones may include boilerplate text, e.g. regions 302 and/or non-textual identifying features such as logos, lines, intersecting lines, shapes, holograms, designs, drawings, etc. such as represented in region 304 of FIG. 3A, according to one embodiment.

Upon reading the present descriptions, skilled artisans will appreciate that the portions of the document obscured by white rectangles are redactions to protect sensitive information, and should not be considered feature zones within the scope of the presently disclosed inventive concepts. Indeed, by way of contrast to the boilerplate content referenced and shown above, the content redacted from FIG. 3A varies from driver license to driver license, and therefore is not suitable for designating or locating identifying features common to all (or most) driver licenses for a particular state.

Variable content may therefore be understood as any content that is not boilerplate content, and commonly includes text and photographic features of a document. According to preferred embodiments, content-based detection and reconstruction of objects within image data as disclosed herein is based on boilerplate content, and not based on variable content.

Figure 3A:
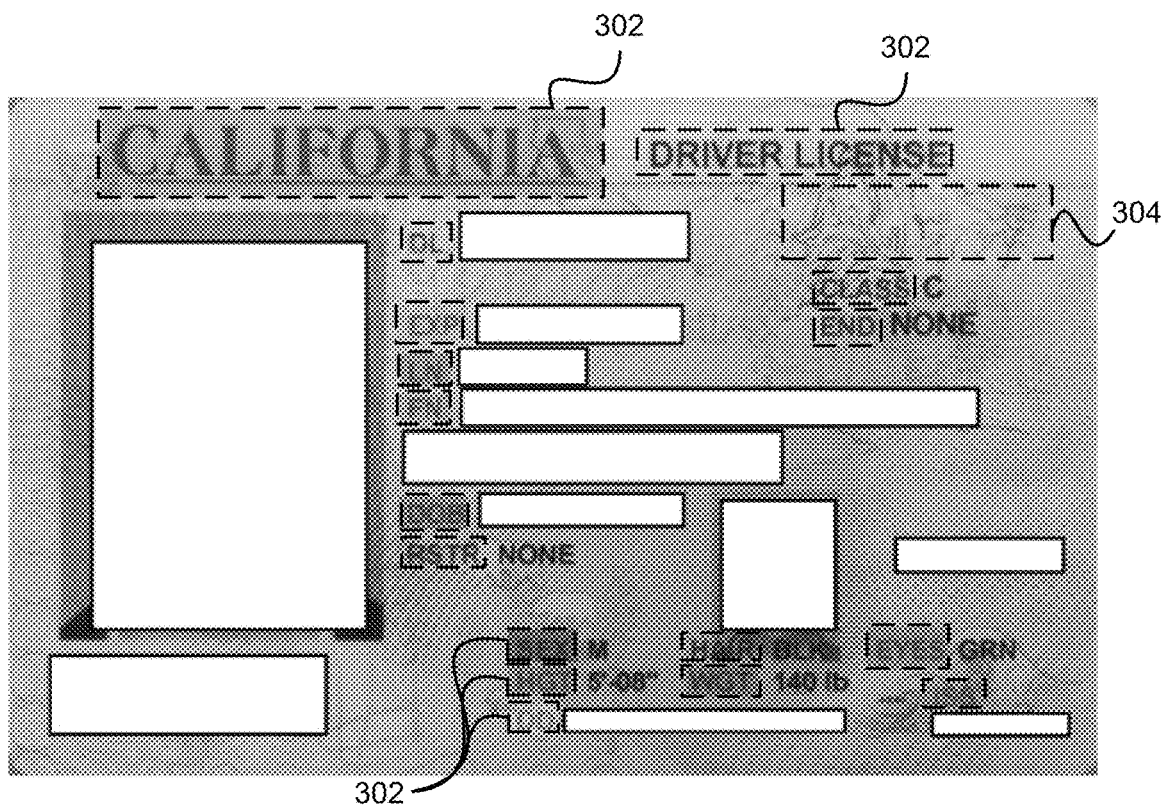
FIG. 3A is a digital image of a document including a plurality of designated feature zones, according to one embodiment.

Although the exemplary embodiment shown in FIG. 3A is a driver license, this is merely illustrative of the type of feature zones that may be designated by a user for purposes of locating and leveraging identifying features as described herein. In other document types, any equivalent text, especially field designators, may be utilized.

For instance on credit or debit cards a region depicting a name of the issuing entity (e.g. VISA, Bank of America, etc.) may be a suitable feature zone, or a region depicting a logo corresponding to the issuing entity, a portion of the card background, a portion of the card depicting a chip (e.g. for a smartcard, an EMV or other equivalent chip), etc. as would be understood by a person having ordinary skill in the art upon reading the present descriptions.

For checks, suitable feature zones may include field designators such as the "MEMO" region of the check, Payee designator "PAY TO THE ORDER OF," boilerplate text such as bank name or address, etc. Similarly, a region including borders of the bounding box designating the numerical payment amount for the check may be a suitable feature zone, in more embodiments.

Similarly, for identification documents such as government-issued IDs including social security cards, driver licenses, passports, etc. feature zones may include field designators that appear on the respective type of identification document, may include text such as the document title (e.g. "United States of America," "Passport," "Social Security," etc.), may include a seal, watermark, logo, hologram, symbol, etc. depicted on the identifying document, or other suitable static information depicted on a same location and in a same manner on documents of the same type.

For forms, again field designators are exemplary feature zones suitable for locating identifying features, as well as lines (particularly intersecting lines or lines forming a vertex), boxes, etc. as would be understood by a person having ordinary skill in the art upon reading the present descriptions.

Preferably, the feature zones defined by the user are defined within a reference image, i.e. an image representing the object according to a preferred or desired capture angle, zoom level, object orientation, and most preferably omitting background textures. Advantageously, defining the feature zones in a reference image significantly reduces the amount of training data necessary to accomplish efficient, accurate, and precise object detection and three-dimensional reconstruction. Indeed, it is possible to utilize a single training example such as shown in FIG. 3A in various embodiments. Reconstruction shall be discussed in further detail below.

To determine identifying features within the feature zones, or within the image as a whole, a feature vector-based approach is preferably implemented. As understood herein, a feature vector is a n-dimensional vector representing characteristics of a pixel within digital image and/or video data. The feature vector may include information representative of the pixel intensity in one or more color channels, pixel brightness, etc. as would be understood by a person having ordinary skill in the art upon reading the present descriptions.

Figure 3B:
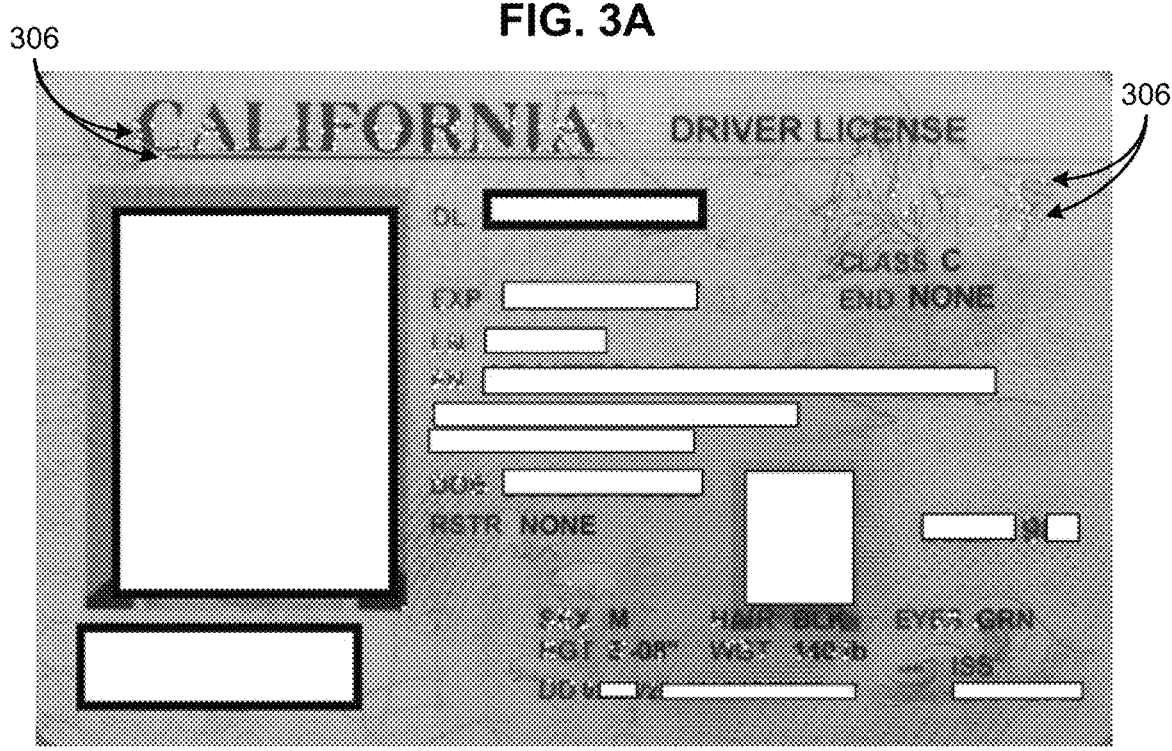
FIG. 3B is a digital image of a document including a plurality of designated identifying features, according to one embodiment.

Preferably, identifying features are characterized by a pixel in a small window of pixels (e.g. 8×8, 15×15, or other suitable value which may be configured based on image resolution) exhibiting a sharp transition in intensity. The identifying features may be determined based on analyzing the feature vectors of pixels in the small window, also referred to herein as a "patch." Frequently, these patches are located in regions including connected components (e.g. characters, lines, etc.) exhibiting a bend or intersection, e.g. as illustrated in FIG. 3B via identifying features 306 (white dots).

Of course, identifying features and/or feature zones may also be determined automatically without departing from the scope of the presently disclosed inventive concepts, but it should be noted that such approaches generally require significantly more training examples than approaches in which feature zones are defined manually in a reference image. Automatically identifying feature zones may also result in a series of identifying features 306 as shown in FIG. 3B, in some approaches.

The aim of automatic feature zone discovery is to find feature points without manually labeling. For instance, in one exemplary embodiment automatically identifying feature zones may include one or more of the following features and/or operations.

In one approach, the algorithm of selecting feature points involves two passes. The first pass of the algorithm includes: pair matching, designation of matching points; determining the set of most frequently used matching points; and selecting the best image index.

Pair matching may involve assuming a set of cropped images, for instance, assume a set of ten cropped images denoted by $c_1, c_2, c_3, \ldots c_{10}$, where at least one image is a reference image. From the assumed set, form a set of image pairs preferably including the reference as one of the images in each image pair. For instance if $c_1$ is used as the reference image, image pairs may include $(c_1, c2), (c_1, c3) \ldots (c_1, c_{10})$. In addition, for each pair $(c_1, c_k)$ ($k=2 \ldots 10$) pair matching includes finding matching key points between the images, e.g. as described above.

Designating matching points may involve denoting the set of matching points appearing in image $c_1$ as $S_k$, i.e., the set $S_k$ includes the set of points in image $c_1$ that match to their corresponding points in image $c_k$. Designating matching points may also involve denoting the set of matching points in image $c_k$ that correspond to the matching points in $S_k$ as the set $T_k$.

Finding the most frequently used points $S_k$ (k=2, 3 . . . 10) may, in turn, include the following. For each point in $\{S_k\}$(k=2, 3 . . . 10), compute the frequency with which the point is used in $\{S_k\}$. If the frequency is above a threshold, for example, 35%, the point is labeled as a "most frequently used" point. In this way, the set of "most frequently used" points in image $c_1$ may be determined, and this set of points is preferably used as the "automatically selected" feature points in image $c_1$. The first pass of the automatic feature identification algorithm may also include denoting the selected most commonly used points for image $c_k$, as $m_k$.

Selecting the best image, in various approaches, may include determining the image with the best image index, i.e. the image exhibiting the maximum value of $m_k$ (k=1, 2 . . . 10) among images $c_1, c_2, \ldots c_{10}$.

FIG. 3B shows exemplary points 306 automatically selected by implementing the above algorithm, according to one embodiment.

However, in some approaches the above algorithm may generate feature point sets that are more conservative, which means that although the precision may be high, the recall may be low. Low recall can be problematic when attempting to match images with a small number of identifying features, superimposed against a particularly complex background, etc. as would be understood by a person having ordinary skill in the art upon reading the present disclosures. Accordingly, in some approaches the automatic feature discovery process may include a second pass aimed at increasing recall of feature point selection.

In a preferred embodiment, the second pass may proceed as follows. Without loss of any generality, suppose that the best image index is 1, that $m_1$ has the maximum value among different values of $m_k$ (k=1, 2 . . . 10), and that this image index represents an undesirably low recall rate. Accordingly, to improve recall, extend the set $m_1$ by adding more selected feature points in image c1. The added features may be characterized by a frequency less than the frequency threshold mentioned above with regard to the first pass, in some embodiments.

Figure 3C:
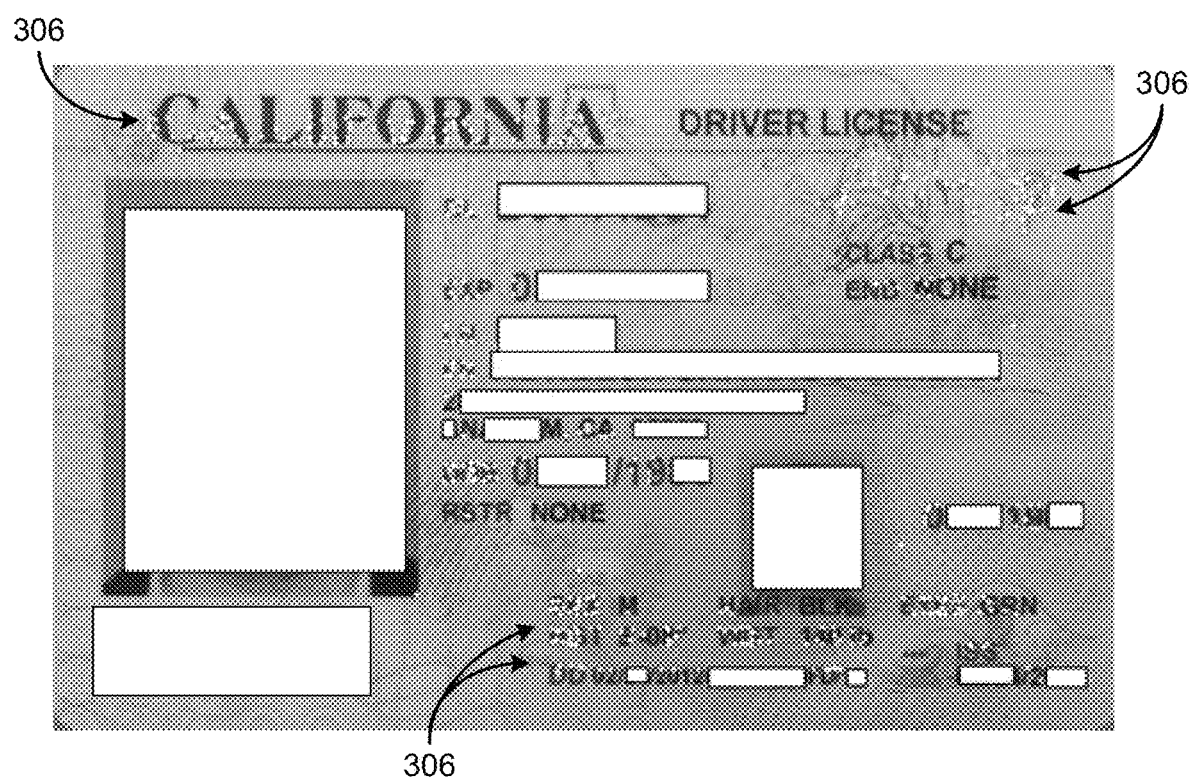
FIG. 3C is a digital image of a document including an extended set of the plurality of designated identifying features, according to another embodiment.

Note that the points in the set $m_k$ belongs to image $c_k$. For each $m_k$ (k=2 . . . 10), find the corresponding matching points in $c_1$. Denote as the set of corresponding feature point as $v_k$ for each $m_k$ where (k=2, 3 . . . 10). The final extended set of selected feature points for image $c_1$ may be defined as the union of $m_1, v_2, v_3 \ldots$ and $v_{10}$. The extended set of selected feature points is shown in FIG. 3C, according to one embodiment. Compared with FIG. 3B, the result shown in FIG. 3C contains more feature points, reflecting the improved recall of the second pass.

It should be noted that, in some approaches, automatic feature zone discovery may be characterized by a systematic bias when operating on cropped images. When observing the layout of text zones or texture zones in different cropped images of the same object, or objects in the same category, there are often variations in layout. There are about 4% to 7% relative changes in locations between different images. The reason for these variations was not only varying angles or 3D distortions, but also due to error inherent to the manufacturing process. In other words, the locations of particular features often are printed at different positions, so that even a scanned image of two different objects of the same type could exhibit some shift in feature location and/or appearance.

The above problem means the generated models may contain systematic bias. In preferred approaches, it is therefore advantageous to implement an algorithm to compensate for such bias. For instance, the bias may be estimated by the mean value of point shifts in different pair images. For instance, if $c_1$ is the best selected image. The average value of point shift between each pair image $(c_1, c_2), (c_1, c_3) \ldots (c_1, c_{10})$ is estimated as the bias. Using this approach, it is possible to account for bias inherent in the automatic feature zone discovery process as described herein.

Feature vectors may be defined using a suitable algorithm, and in one embodiment a Binary Robust Independent Elementary Feature (BRIEF) is one suitable method to define a feature vector or descriptor for a pixel in an image. BRIEF uses grayscale image data as input, but in various embodiments other color depth input image data, and/or other feature vector defining techniques, may be utilized without departing from the scope of the present descriptions.

In one embodiment, the first step in this algorithm is to remove noise from the input image. This may be accomplished using a low-pass filter to remove high frequency noise, in one approach.

The second step is the selection of a set of pixel pairs in the image patch around a pixel. For instance, in various approaches pixel pairs may include immediately adjacent pixels in one or more of four cardinal directions (up, down, left, and right) and/or diagonally adjacent pixels.

The third step is the comparison of image intensities of each pixel pair. For instance, for a pair of pixels (p, q), if the intensity at pixel p is less than that at pixel q, the comparison result is 1. Otherwise, the result of the comparison is 0. These comparison operations are applied to all selected pixel pairs, and a feature vector for this image patch is generated by concatenating these 0/1 values in a string.

Assuming a patch comprising 64 pixels, the patch feature vector can have a length of 128, 256, 512, etc. in various approaches and depending on the nature of the comparison operations. In a preferred embodiment, the feature vector of the patch has a length of 256, e.g. for a patch comprising a square 8 pixels long on each side and in which four comparisons are performed for each pixel in the patch (left, right, upper and lower neighbor pixels).

A patch descriptor is a representation of a feature vector at a pixel in an image. The shape of a patch around a pixel is usually square or rectangular, but any suitable shape may be employed in various contexts or applications, without departing from the scope of the presently disclosed inventive concepts.

In some embodiments, and as noted above the value of each element in a feature vector descriptive of the patch is either 1 or 0, in which case the descriptor is a binary descriptor. Binary descriptors can be represented by a string of values, or a "descriptor string."

As described herein, a descriptor string is analogous to a word in natural language. It can also be called a "visual word." Similarly, an image is analogous to a document which is characterized by including a particular set of visual words. These visual words include features that are helpful for tasks such as image alignment and image recognition. For instance, for image alignment, if there are distinctive visual words in two images, aligning the images based on matching the visual words is easier than attempting to align the images de novo.

The distance between two descriptor strings can be measured by an edit distance or a Hamming distance, in alternative embodiments. Determining distance is a useful indicator of whether two different images, e.g. a reference image and a test image, depict similar content at particular positions. Thus, two images with very small distance between descriptor strings corresponding to identifying features of the respective images are likely to match, especially if the spatial distribution of the proximate identifying features is preserved between the images.

In the original implementation of a BRIEF descriptor algorithm for defining patch feature vectors, there are no patch orientations, which means that the descriptor is not rotation invariant. However, patch orientations are important to generate patch descriptors which are invariant to image rotations. Accordingly, in preferred approaches the feature vector, e.g. BRIEF descriptors, are enhanced with patch orientations which can be estimated using patch momentum. Patch momentum may be analyzed using any suitable technique that would be understood by a person having ordinary skill in the art upon reading the present disclosures.

In one embodiment, an "oriented Features from Accelerated Segment Test (FAST) and rotated BRIEF" (ORB) algorithm may be employed to enhance descriptors with orientation information. After getting the patch orientations, each descriptor is normalized by rotating the image patch with the estimated rotation angle.

As noted above regarding FIGS. 3A-3C, in preferred approaches the image includes one or more identifying features 306, which are characterized by a sharp transition in pixel intensity within a patch. Accordingly, the position of these identifying features 306 (which may also be considered distinctive visual words or key points) is determined.

Key point selection includes finding pixels in an image that have distinctive visual features. These pixels with distinctive features are at positions where image intensities change rapidly, such as corners, stars, etc. Theoretically speaking, every pixel in an image can be selected as a key point. However, there may be millions of pixels in an image, and using all pixels in image matching is very computationally intensive, without providing a corresponding improvement to accuracy. Therefore, distinctive pixels, which are characterized by being in a patch exhibiting a rapid change in pixel intensity, are a suitable set of identifying features with which to accurately match images while maintaining reasonable computational efficiency. In one embodiment, a FAST (Features from Accelerated Segment Test) algorithm may be implemented to select key points in image data and/or video data.

In various approaches, image descriptors that are described in the previous sections are not scale invariant. Therefore, the scale of a training image and a testing image should be the same in order to find the best match. For a reference image, a priori knowledge regarding the physical size of the object and image resolution may be available. In such embodiments, it is possible and advantageous to estimate the DPI in the reference image. Notably, in some approaches using a high resolution (e.g. 1920×1080 or greater, 200 DPI or greater) training image may produce too many key points which will slow down image matching process.

In order to optimize the matching time and accuracy, an appropriate reduced DPI level of image/video data is used, in some approaches. Accordingly, for high resolution training images, it is beneficial to scale down to a smaller image resolution, e.g. with a specific DPI level. For instance, the reduced DPI level is 180 in one embodiment determined to function well in matching images of driver licenses, credit cards, business cards, and other similar documents.

For a test image, the DPI of an object to be detected or matched is generally not known. In order to account for this potential variation, it is useful to define a range that the actual image/video data resolution may reasonably fall within. In one embodiment, this may be accomplished substantially as follows. The range of resolution values may be quantized with a set of values, in some approaches. For instance, if the resolution range is in a search interval (a, b), where a and b are minimum and maximum DPI values respectively, then the interval (a, b) are divided into a set of sub intervals. The test image is scaled down to a set of images with different, but all reduced, resolutions, and each re-scaled image is matched to the training image. The best match found indicates the appropriate downscaling level.

The detail of a matching algorithm, according to one embodiment, is as follows. For each resolution in the search interval: a test image is scaled down to the resolution used in the reference image. A brute-force matching approach may be employed to identify the matching points between the reference image and test image. The key points in the reference image are matched against some, or preferably all, key points identified in the testing image. First, the best match for each key point both in the reference image and test image is identified by comparing the distance ratio of the two best candidate matches. When the distance ratio is larger than a predetermined threshold, the match is identified as an outlier.

After distance ratio testing, in some embodiments a symmetrical matching test may be applied to further identify other potential remaining outliers. In the symmetrical matching test, if the match between key points in the reference image and test image is unique (i.e. the key points in the reference and test image match one another, but do not match any other key points in the corresponding image), then the key points will be kept. If a match between corresponding key point(s) in the reference image and test image is not unique, those key points will be removed.

After performing brute-forced matching, there are still potential outliers in the remaining matches. Accordingly, an outlier identification algorithm such as a Random Sample Consensus (RANSAC) algorithm is applied to further remove outliers. The details of RANSAC algorithm are summarized below. In one embodiment implementing the RANSAC algorithm, the best match is found, and the number of matching key points is recorded.

RANSAC is a learning technique to estimate parameters of a model by random sampling of observed data. For plane image matching tasks, such as documents, the model is a homograph transformation of a 3 by 3 matrix.

In one embodiment, the RANSAC algorithm to estimate the homograph transformation is as follows. First, randomly select four key points in a testing image, and randomly select four key points in a reference image. Second, estimate a homograph transform with the above four key point pairs using a four-point algorithm, e.g. as described below regarding image reconstruction. Third, apply the homograph transformation to all key points in the reference and testing images. The inlier key points are identified if they match the model well, otherwise the key points will be identified as outliers. In various embodiments, more than four points may be selected for this purpose, but preferably four points are utilized to minimize computational overhead while enabling efficient, effective matching.

The foregoing three-step process is repeated in an iterative fashion to re-sample the key points and estimate a new homograph transform. In one embodiment, the number of iterations performed may be in a range from about $10^2$-$10^3$ iterations. After the iterative identification of key points is complete, the largest inlier set is retained, and an affine or homograph transform is re-estimated based on the retained inlier set.

After removing outliers, the matching process selects the reference image with the maximum number of matching points as the best match, and an affine or homograph transform is estimated with the best match to reconstruct the image and/or video data in a three-dimensional coordinate system. Image reconstruction mechanics are discussed in further detail below.

Figure 4A:
FIG. 4A depicts a mapping between matching distinctive features of a reference image and test image of a driver license, according to one embodiment.
Figure 4B:
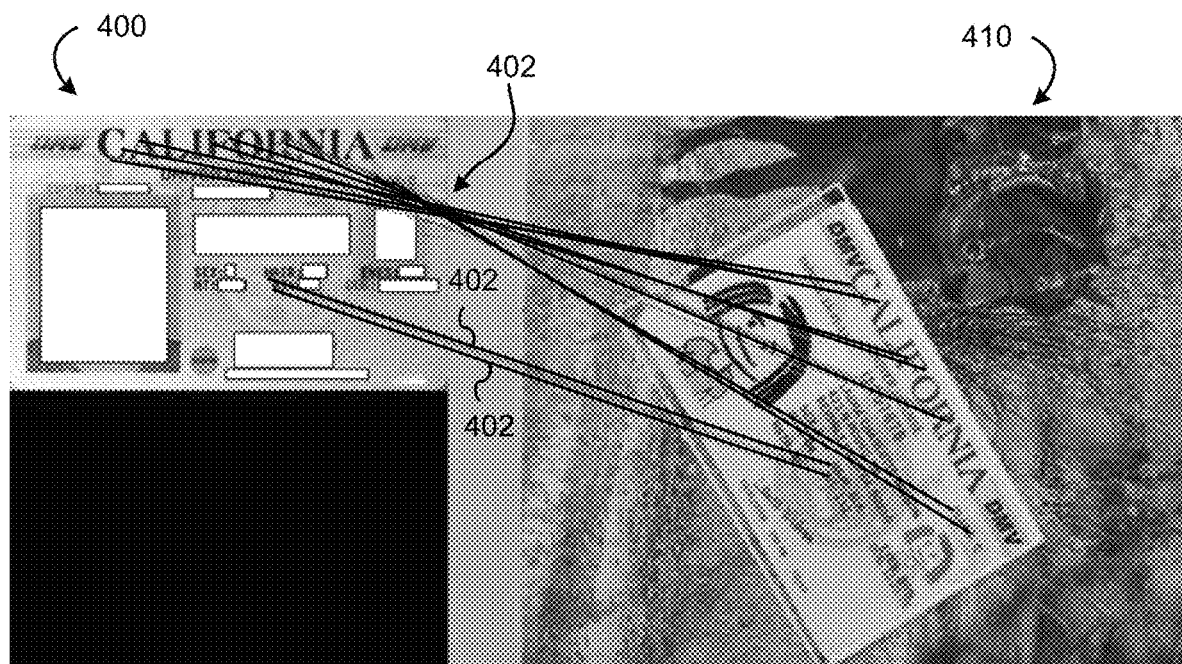
FIG. 4B depicts a mapping between matching distinctive features of a reference image and test image of a driver license, according to another embodiment where the test and reference images depict the driver license at different rotational orientations.
Figure 4C:
FIG. 4C depicts a mapping between matching distinctive features of a reference image and test image of a credit card, according to one embodiment.

Exemplary mappings of key points between a reference image 400 and test image 410 are shown, according to two embodiments, in FIGS. 4A-4B, with mapping lines 402 indicating the correspondence of key points between the two images. FIG. 4C depicts a similar reference/test image pair, showing a credit or debit card and exemplary corresponding key points therein, according to another embodiment.

Advantageously, by identifying internal key points and mapping key points located in a test image 410 to corresponding key points in a reference image 400, the presently disclosed inventive concepts can detect objects depicted in image and/or video data even when the edges of the object are obscured or missing from the image, or when a complex background is present in the image or video data.

Once an appropriate transform is estimated, the presently disclosed inventive concepts advantageously allow the estimation of object edge/border locations based on the transform. In brief, based on the edge locations determined from the reference image data, it is possible to estimate the locations of corresponding edges/borders in the test image via the transform, which defines the point-to-point correspondence between the object as oriented in the test image and a corresponding reference image orientation within the same coordinate system. According to the embodiment shown in FIGS. 4A and 4B, estimating the edge locations involves evaluating the transform of the document plane shown in test image 410 to the document plane shown in the reference image 400 (or vice versa), and extrapolating edge positions based on the transform.

FIG. 4C shows a similar mapping of key points between a reference image 400 and test image 410 of a credit card. In the particular case of credit cards, and especially credit cards including an IC chip, it is possible to identify key points within the region of the card including the IC chip, and estimate transform(s) and/or border locations using these regions as the sole source of key points, in various embodiments. Accordingly, the presently disclosed inventive concepts are broadly applicable to various different types of objects and identifying features, constrained only by the ability to obtain and identify appropriate identifying features in a suitable reference image or set of reference images. Those having ordinary skill in the art will appreciate the scope to which these inventive concepts may be applied upon reading the instant disclosures.

Based on the transform, and the projected object edges, the presently disclosed inventive concepts may include transforming and cropping the test image to form a cropped, reconstructed image based on the test image, the cropped, reconstructed image depicting the object according to a same perspective and cropping of the object as represented in the reference image perspective.

In addition, preferred embodiments may include functionality configured to refine the projected location of object edges. For example, considering the results depicted in FIGS. 4A-4C and 5, a skilled artisan will understand that the projected edges achieved in these exemplary embodiments are not as accurate as may be desired.

Figure 5:
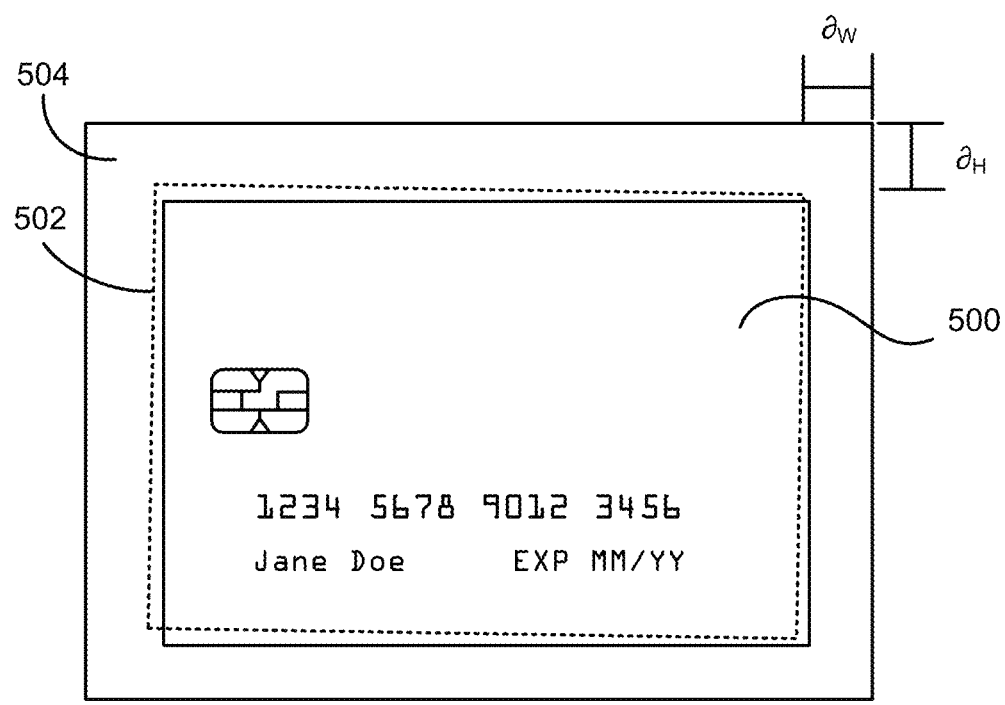
FIG. 5 is a simplified schematic of a credit card having edges thereof projected based on internal features of the credit card, according to one embodiment.

As shown in FIG. 5, an object 500 such as a credit card or other document is depicted in a test image, and edge locations 502 are projected based on the foregoing content-based approach. However, the projected edge locations 502 do not accurately correspond to the actual edges of the object 500. Accordingly, it may be advantageous, in some approaches, rather than cropping directly according to the projected edge locations 502, to crop in a manner so as to leave a predetermined amount of background texture depicted in the cropped image, and subsequently perform conventional edge detection. Conventional edge detection shall be understood to include any technique for detecting edges based on detecting transitions between an image background 504 and image foreground (e.g. object 500) as shown in FIG. 5. For example, in preferred approaches conventional edge detection may include any technique or functionality as described in U.S. Pat. No. 8,855,375 to Macciola, et al.

The predetermined amount may be represented by a threshold $\partial$, which may be a predefined number of pixels, a percentage of an expected aspect ratio, etc. in various embodiments. In some approaches, the amount may be different for each dimension of the image and/or object, e.g. for flat objects a predetermined height threshold $\partial_H$ and/or predetermined width threshold $\partial_W$ may be used. $\partial_H$ and $\partial_W$ may be determined experimentally, and need not be equal in various embodiments. For instance, $\partial_H$ and $\partial_W$ may independently be absolute thresholds or relative thresholds, and may be characterized by different values.

In this way, one obtains an image where the document is prominent in the view and the edges reside within some known margin. Now it is possible to employ normal or specialized edge detection techniques, which may include searching for the edge only within the margin. In "normal" techniques, the threshold for detection can be less stringent than typically employed when searching for edges using only a conventional approach, without content-based detection augmentation. For instance, in "normal" techniques the contrast difference required to identify an edge may be less than the difference required without content-based detection augmentation. In "specialized" techniques, one could allow for increased tolerance regarding existence of gaps in the edge than would normally be prudent when searching an entire image (e.g. as would be present in FIG. 4A).

In various approaches, a further validation may be performed on the image and/or video data by classifying the cropped, reconstructed image. Classification may be performed using any technique suitable in the art, preferably a classification technique as described in U.S. patent application Ser. No. 13/802,226 (filed Mar. 13, 2013). If the classification result returns the appropriate object type, then the image matching and transform operations are likely to have been correctly achieved, whereas if a different object type is returned from classification, then the transform and/or cropping result are likely erroneous. Accordingly, the presently disclosed inventive concepts may leverage classification as a confidence measure to evaluate the image matching and reconstruction techniques discussed herein.

As described herein, according to one embodiment a method 700 for detecting objects depicted in digital images based on internal features of the object includes operations as depicted in FIG. 7. As will be understood by a person having ordinary skill in the art upon reading the present descriptions, the method 700 may be performed in any suitable environment, including those depicted in FIGS. 1-2 and may operate on inputs and/or produce outputs as depicted in FIGS. 3A-5, in various approaches.

As shown in FIG. 7, method 700 includes operation 702, in which a plurality of identifying features of the object are detected. Notably, the identifying features are located internally with respect to the object, such that each identifying feature is, corresponds to, or represents a part of the object other than object edges, boundaries between the object and image background, or other equivalent transition between the object and image background. In this manner, and according to various embodiments the presently disclosed inventive content-based object recognition techniques are based exclusively on the content of the object, and/or are performed exclusive of traditional edge detection, border detection, or other similar conventional recognition techniques known in the art.

The method 700 also includes operation 704, where a location of one or more edges of the object are projected, the projection being based at least in part on the plurality of identifying features.

Of course, the method 700 may include any number of additional and/or alternative features as described herein in any suitable combination, permutation, selection thereof as would be appreciated by a skilled artisan as suitable for performing content-based object detection, upon reading the instant disclosures.

For instance, in one embodiment, method 700 may additionally or alternatively include detecting the plurality of identifying features based on analyzing a plurality of feature vectors each corresponding to pixels within a patch of the digital image. The analysis may be performed in order to determine whether the patch includes a sharp transition in intensity, in preferred approaches. The analysis may optionally involve determining a position of some or all of the plurality of identifying features, or position determination may be performed separately from feature vector analysis, in various embodiments.

Optionally, in one embodiment detecting the plurality of identifying features involves automatic feature zone discovery. The automatic feature zone discovery may be a multi-pass procedure.

Method 700 may also include identifying a plurality of distinctive pixels within the plurality of identifying features of the object. Distinctive pixels are preferably characterized by having or embodying distinct visual features of the object.

In a preferred approach, method 700 also includes matching the digital image depicting the object to one of a plurality of reference images each depicting a known object type. The reference images are more preferably images used to train the recognition/detection engine to identify specific identifying features that are particularly suitable for detecting and/or reconstructing objects of the known object type in various types of images and/or imaging circumstances (e.g. different angles, distances, resolutions, lighting conditions, color depths, etc. in various embodiments). Accordingly, the matching procedure may involve determining whether the object includes distinctive pixels that correspond to distinctive pixels present in one or more of the plurality of reference images.

The method 700 may also include designating as an outlier a candidate match between a distinctive pixel in the digital image and one or more candidate corresponding distinctive pixels present in one of the plurality of reference images. The outlier is preferably designated in response to determining a distance ratio is greater than a predetermined distance ratio threshold. Moreover, the distance ratio may be a ratio describing: a first distance between the distinctive pixel in the digital image and a first of the one or more candidate corresponding distinctive pixels; and a second distance between the distinctive pixel in the digital image and a second of the one or more candidate corresponding distinctive pixels.

In more embodiments, method 700 includes designating as an outlier a candidate match between a distinctive pixel in the digital image and a candidate corresponding distinctive pixel present in one of the plurality of reference images in response to determining the candidate match is not unique. Uniqueness may be determined according to a symmetrical matching test, in preferred approaches and as described in greater detail hereinabove.

Notably, employing reconstruction as set forth herein, particularly with respect to method 700, carries the advantage of being able to detect and recognize objects in images where at least one edge of the object is either obscured or missing from the digital image. Thus, the presently disclosed inventive concepts represent an improvement to image processing machines and the image processing field since conventional image detection and image processing/correction techniques are based on detecting the edges of objects and making appropriate corrections based on characteristics of the object and/or object edges (e.g. location within image, dimensions such as particularly aspect ratio, curvature, length, etc.). In image data where edges are missing, obscured, or otherwise not represented at least in part, such conventional techniques lack the requisite input information to perform the intended image processing/correction.

In some approaches, the method 700 may include cropping the digital image based at least in part on the projected location of the one or more edges of the object. The cropped digital image preferably depicts a portion of a background of the digital image surrounding the object; and in such approaches method 700 may include detecting one or more transitions between the background and the object within the cropped digital image.

The method 700 may optionally involve classifying the object depicted within the cropped digital image. As described in further detail elsewhere herein, classification may operate as a type of orthogonal validation procedure or confidence measure for determining whether image recognition and/or reconstruction was performed correctly by implementing the techniques described herein. In brief, if a reconstructed image of an object is classified and results in a determination that the object depicted in the reconstructed image is a same type of object represented in/by the reference image used to reconstruct the object, then it is likely the reconstruction was performed correctly, or at least optimally under the circumstances of the image data.

With continuing reference to classification, method 700 in one embodiment may include: attempting to detect the object within the digital image using a plurality of predetermined object detection models each corresponding to a known object type; and determining a classification of the object based on a result of attempting to detect the object within the digital image using the plurality of predetermined object detection models. The classification of the object is the known object type corresponding to one of the object detection models for which the attempt to detect the object within the digital image was successful.

The method 700, in additional aspects, may include: generating a plurality of scaled images based on the digital image, each scaled image being characterized by a different resolution; extracting one or more feature vectors from each scaled image; and matching one or more of the scaled images to one of a plurality of reference images. Each reference image depicts a known object type and being characterized by a known resolution.

Of course, in various embodiments and as described in greater detail below, the techniques and features of method 700 may be combined and used to advantage in any permutation with the various image reconstruction techniques and features such as presented with respect to method 800.

Content-Based Image Reconstruction

Reconstructing image and/or video data as described herein essentially includes transforming the representation of the detected object as depicted in the captured image and/or video data into a representation of the object as it would appear if viewed from an angle normal to a particular surface of the object. In the case of documents, or other flat objects, this includes reconstructing the object representation to reflect a face of the flat object as viewed from an angle normal to that face. For such flat objects, if the object is characterized by a known geometry (e.g. a particular polygon, circle, ellipsoid, etc.) then a priori knowledge regarding the geometric characteristics of the known geometry may be leveraged to facilitate reconstruction For other objects having three-dimensional geometries, and/or flat objects having non-standard geometries, reconstruction preferably includes transforming the object as represented in captured image and/or video data to represent a same or similar object type as represented in one or more reference images captured from a particular angle with respect to the object. Of course, reference images may also be employed to facilitate reconstruction of flat objects in various embodiments and without departing from the scope of the presently disclosed inventive concepts.

Accordingly, in preferred approaches the reconstructed representation substantially represents the actual dimensions, aspect ratio, etc. of the object captured in the digital image when viewed from a particular perspective (e.g. at an angle normal to the object, such as would be the capture angle if scanning a document in a traditional flatbed scanner, multifunction device, etc. as would be understood by one having ordinary skill in the art upon reading the present descriptions).

Various capture angles, and the associated projective effects are demonstrated schematically in FIGS. 6A-6D.

In some approaches, the reconstruction may include applying an algorithm such as a four-point algorithm to the image data.

In one embodiment, perspective correction may include constructing a 3D transformation based at least in part on the spatial distribution of features represented in the image and/or video data.

A planar homography/projective transform is a non-singular linear relation between two planes. In this case, the homography transform defines a linear mapping of four randomly selected pixels/positions between the captured image and the reference image.

The calculation of the camera parameters may utilize an estimation of the homography transform H, such as shown in Equation (1), in some approaches.

$$\lambda \begin{pmatrix} x \\ y \\ 1 \end{pmatrix} = \underbrace{\begin{pmatrix} h_{11} & h_{12} & h_{13} \\ h_{21} & h_{22} & h_{23} \\ h_{31} & h_{32} & h_{33} \end{pmatrix}}_{\text{homography } H} \begin{pmatrix} X \\ Y \\ 1 \end{pmatrix}. \quad (1)$$

As depicted above in Equation (1):

$\lambda$ is the focal depth of position (X, Y, Z) in the "reference" or "real-world" coordinate system, (e.g. a coordinate system derived from a reference image,). Put another way, $\lambda$ may be considered the linear distance between a point (X,Y,Z) in the reference coordinate system and the capture device;

(x, y, z) are the coordinates of a given pixel position in the captured image; and H is a (3×3) matrix having elements $h_{ij}$, where, i and j define the corresponding row and column index, respectively.

In one approach, the (x, y) coordinates and (X, Y) coordinates depicted in Equation 1 correspond to coordinates of respective points in the captured image plane and the reference image. In some approaches, the Z coordinate may be set to 0, corresponding to an assumption that the object depicted in each lies along a single (e.g. X-Y) plane with zero thickness. In one embodiment, it is possible to omit the z value in Equation 1 from the above calculations because it does not necessarily play any role in determining the homography matrix.

Thus, the homography H can be estimated by detecting four point-correspondences $p_i \leftrightarrow P_i'$ with $p_i=(x_i, y_i, 1)^T$ being the position of a randomly selected feature in the captured image plane; and $P_i'=(X_i, Y_i, 1)^T$ being the coordinates of the corresponding position in the reference image, where i is point index value with range from 1 to n in the following discussion. Using the previously introduced notation, Equation (1) may be written as shown in Equation (2) below.

$$\lambda p_i = HP_i', \quad (2)$$

In order to eliminate a scaling factor, in one embodiment it is possible to calculate the cross product of each term of Equation (2), as shown in Equation (3):

$$p_i \times (\lambda p_i) = p_i \times (HP_i'), \quad (3)$$

Since $p_i \times p_i = 0_3$, Equation (3) may be written as shown below in Equation (4).

$$p_i \times HP_i' = 0_3, \quad (4)$$

Thus, the matrix product $HP_i'$ may be expressed as in Equation (5).

$$HP_i' = \begin{bmatrix} h^{1T} P_i' \\ h^{2T} P_i' \\ h^{3T} P_i' \end{bmatrix}, \quad (5)$$

According to Equation 5, $h^{mT}$ is the transpose of the $m^{th}$ row of H (e.g. $h^{1T}$ is the transpose of the first row of H, $h^{2T}$ is the transpose of the second row of H, etc.). Accordingly, it is possible to rework Equation (4) as:

$$p_i \times HP_i' = \begin{pmatrix} x_i \\ y_i \\ 1 \end{pmatrix} \times \begin{bmatrix} h^{1T} P_i' \\ h^{2T} P_i' \\ h^{3T} P_i' \end{bmatrix} = \begin{bmatrix} y_i h^{3T} P_i' - h^{2T} P_i' \\ h^{1T} P_i' - x_i h^{3T} P_i' \\ x_i h^{2T} P_i' - y_i h^{1T} P_i' \end{bmatrix} = 0_3. \quad (6)$$

Notably, Equation (6) is linear in $h^{mT}$ and $h^{mT} P_i' = P_i'^T h^m$. Thus, Equation (6) may be reformulated as shown below in Equation (7):

$$\begin{bmatrix} 0_3^T & -P_i' & y_i P_i'^T \\ P_i'^T & 0_3^T & -x_i P_i'^T \\ -y_i P_i'^T & x_i P_i'^T & 0_3^T \end{bmatrix} \begin{bmatrix} h^1 \\ h^2 \\ h^3 \end{bmatrix} = 0_3. \quad (7)$$

Note that the rows of the matrix shown in Equation (7) are not linearly independent. For example, in one embodiment the third row is the sum of $-x_i$ times the first row and $-y_i$ times the second row. Thus, for each point-correspondence, Equation (7) provides two linearly independent equations. The two first rows are preferably used for solving H.

Because the homography transform is written using homogeneous coordinates, in one embodiment the homography H may be defined using 8 parameters plus a homogeneous scaling factor (which may be viewed as a free 9$^{th}$ parameter). In such embodiments, at least 4 point-correspondences providing 8 equations may be used to compute the homography. In practice, and according to one exemplary embodiment, a larger number of correspondences is preferably employed so that an over-determined linear system is obtained, resulting in a more robust result (e.g. lower error in relative pixel-position). By rewriting H in a vector form as $h=[h_{11},h_{12},h_{13},h_{21},h_{22},h_{23},h_{31},h_{32},h_{33}]^T$, n pairs of point-correspondences enable the construction of a 2n×9 linear system, which is expressed by Equation (8)

$$\underbrace{\begin{pmatrix} 0 & 0 & 0 & -X_1 & -Y_1 & -1 & y_1 X_1 & y_1 X_1 & y_1 \\ X_1 & Y_1 & 1 & 0 & 0 & 0 & -x_1 X_1 & -x_1 Y_1 & -x_1 \\ 0 & 0 & 0 & -X_2 & -Y_2 & -1 & y_2 X_2 & y_2 X_2 & y_2 \\ X_2 & Y_2 & 1 & 0 & 0 & 0 & -x_2 X_2 & -x_2 Y_2 & -x_2 \\ \vdots & \vdots & \vdots & \vdots & \vdots & \vdots & \vdots & \vdots & \vdots \\ 0 & 0 & 0 & -X_n & -Y_n & -1 & y_n X_n & y_n X_n & y_n \\ X_n & Y_n & 1 & 0 & 0 & 0 & -x_n X_n & -x_n Y_n & -x_n \end{pmatrix}}_{C} \begin{pmatrix} h_{11} \\ h_{12} \\ h_{13} \\ h_{21} \\ h_{22} \\ h_{23} \\ h_{31} \\ h_{32} \\ h_{33} \end{pmatrix} = 0_3. \quad (8)$$

As shown in Equation 8, the first two rows correspond to the first feature point, as indicated by the subscript value of coordinates X, Y, x, y—in this case the subscript value is 1. The second two rows correspond to the second feature point, as indicated by the subscript value 2, the last two rows correspond to the n$^{th}$ feature point. For a four-point algorithm, n is 4, and the feature points are the four randomly selected features identified within the captured image and corresponding point of the reference image.

In one approach, solving this linear system involves the calculation of a Singular Value Decomposition (SVD). Such an SVD corresponds to reworking the matrix to the form of the matrix product $C=UDV^T$, where the solution h corresponds to the eigenvector of the smallest eigenvalue of matrix C, which in one embodiment may be located at the last column of the matrix V when the eigenvalues are sorted in descendant order.

It is worth noting that the matrix C is different from the typical matrix utilized in an eight-point algorithm to estimate the essential matrix when two or more cameras are used, such as conventionally performed for stereoscopic machine vision. More specifically, while the elements conventionally used in eight-point algorithm consist of feature points projected on two camera planes, the elements in the presently described matrix C consist of feature points projected on only a single camera plane and the corresponding feature points on 3D objects.

In one embodiment, to avoid numerical instabilities, the coordinates of point-correspondences may preferably be normalized. This may be accomplished, for example, using a technique known as the normalized Direct Linear Transformation (DLT) algorithm. For example, in one embodiment, after the homography matrix is estimated, Equation 1 may be used to compute each pixel position (x, y) for a given value of (X, Y). In practical applications the challenge involves computing (X, Y) when the values of (x, y) are given or known a priori. As shown in Equation 1, and in preferred embodiments, (x, y) and (X, Y) are symmetrical (i.e. when the values of (x, y) and (X, Y) are switched, the validity of Equation 1 holds true). In this case, the "inverse" homography matrix may be estimated, and this "inverse" homography matrix may be used to reconstruct 3D (i.e. "reference" or "real-world") coordinates of an object given the corresponding 2D coordinates of the object as depicted in the captured image, e.g. in the camera view.

Based on the foregoing, it is possible to implement the presently described four-point algorithm (as well as any equivalent variation and/or modification thereof that would be appreciated by a skilled artisan upon reading these descriptions) which may be utilized in various embodiments to efficiently and effectively reconstruct digital images characterized by at least some perspective distortion into corrected digital images exempting any such perspective distortion, where the corrected image is characterized by a pixel location error of about 5 pixels or less.

Various embodiments may additionally and/or alternatively include utilizing the foregoing data, calculations, results, and/or concepts to derive further useful information regarding the captured image, object, etc. For example, in various embodiments it is possible to determine the distance between the captured object and the capture device, the pitch and/or roll angle of the capture device, etc. as would be understood by one having ordinary skill in the art upon reading the present descriptions.

After (X, Y) values are estimated, the expression in Equation 1 may be described as follows:

$$\lambda = h_{31} X + h_{32} Y + h_{33} \quad (9)$$

Accordingly, in one embodiment the focal depth, also known as the distance between each point (X, Y, Z) in the 3D (i.e. "reference" or "real world") coordinate system and the capture device, may be computed using Equation 9 above.

Determining a Rotation Matrix of the Object.

After estimating the position of the 3D object (X, Y) and λ for each pixel in the captured image. Note that (X, Y) are the coordinates in the world coordinate system, while λ is the distance to the point (X, Y) in the camera coordinate system. If the 3D object is assumed to be a rigid body, it is appropriate to use the algorithm disclosed herein to estimate the rotation matrix from the world coordinate system to the camera coordinate system. The following equation holds for rotation and translation of the point (X, Y, 0):

$$\begin{pmatrix} X_c \\ Y_c \\ Z_c \end{pmatrix} = R \begin{pmatrix} X \\ Y \\ 0 \end{pmatrix} + t \quad (10)$$

where (Xc, Yc, Zc) are the coordinates relative to camera coordinate system, which are derived by rotating a point (X, Y, Z) in the world coordinate system with rotation matrix R, and a translation vector of t, where t is a constant independent of (X, Y). Note that the value of Zc is the same as the value of λ, as previously estimated using equation 9.

Considering the relationships of homography matrix H and intrinsic camera parameter matrix A and r1, r2, where r1, r2 are the first and second column vectors respectively, reveals the following relationship:

$$H = \sigma A(r_1, r_2, t) \tag{11}$$

where σ is a constant and A is the intrinsic camera parameter matrix, defined as:

$$A = \begin{pmatrix} a & c & d \\ & b & e \\ & & 1 \end{pmatrix} \tag{12}$$

where a and b are scaling factors which comprise of the camera focal length information, a=f/dx, and b=f/dy, where f is the focal length, while dx, dy are scaling factors of the image; c is the skew parameter about two image axes, and (d, e) are the coordinates of the corresponding principal point.

After estimation of homography matrix H, the matrix A can be estimated as follows:

$$a = \sqrt{w/B_{11}}; \tag{12.1}$$

$$b = \sqrt{wB_{11}(B_{11}B_{22} - B_{12}^2)}; \tag{12.2}$$

$$c = -B_{12}a^2b/w; \; d = \frac{vv_0}{b} - B_{13}a^2/w; \tag{12.3}$$

$$v = -B_{12}a^2b/w; \tag{12.4}$$

$$e = (B_{12}B_{13} - B_{11}B_{23})/(B_{11}B_{22} - B_{12}^2); \tag{12.5}$$

$$w = B_{33} - (B_{13}^2 + e(B_{12}B_{13} - B_{11}B_{23}))/B_{11}. \tag{12.6}$$

In the above relationships, the unknown parameters are $B_{ij}$. These values are estimated by the following equations:

$$\begin{pmatrix} v_{12}^t \\ (v_{11} - v_{22})^t \end{pmatrix} G = 0, \tag{12.7}$$

where G is the solution of the above equation, alternatively expressed as:

$$G = (B_{11}, B_{12}, B_{22}, B_{13}, B_{23}, B_{33})^t, \tag{12.8}$$

where $v_{ij} = (h_{i1}h_{j1}, h_{i1}h_{j2} + h_{i2}h_{j1}, h_{i2}h_{j2}, h_{i3}h_{j1} + h_{i1}h_{j3}, h_{i3}h_{j2} + h_{i2}h_{j3}, h_{i3}h_{j3})^t$ \tag{12.9}

Note that in a conventional four-points algorithm, since it is possible to accurately estimate scaling factors a, b, the skew factor c is assumed to be zero, which means that one may ignore camera's skew distortion. It is further useful, in one embodiment, to assume that d and e have zero values (d=0, e=0).

From equation (11), B=(r1 r2 t), where $\sigma^{-1}$ $A^{-1}H$=B. Utilizing this relationship enables a new approach to estimate r1, r2 from the equation C=(r1 r2 0) where the first and second column vectors of C are the first and second column vectors of B, and the third column vector of C is 0.

First, decompose matrix C with SVD (Singular Value Decomposition) method, $C = U\Sigma V^t$, where U is 3 by 3 orthogonal matrix, where V is 3 by 3 orthogonal matrix. Then r1 and r2 are estimated by the following equation:

$$(r_1 \; r_2 \; 0) = U \begin{pmatrix} W \\ 0 \end{pmatrix} \tag{13}$$

where W is a 2 by 3 matrix whose first and second row vectors are the first and second row vectors of $V^t$ respectively. In the above computation, assume σ is 1. This scaling factor does not influence the value of U and W and therefore does not influence the estimation of r1 and r2. After r1, r2 are estimated (e.g. using Equation 13), it is useful to leverage the fact that R is a rotation matrix to estimate r3, which is the cross product of r1 and r2 with a sign to be determined (either 1 or −1). There are two possible solutions of R. In one example using a right-hand coordinate system, the r3 value is the cross-product value of r1 and r2.

Determining Yaw, Pitch, and Roll from a Rotation Matrix.

The yaw, pitch and roll (denoted by the α, β and γ respectively) are also known as Euler's angles, which are defined as the rotation angles around z, y, and x axes respectively, in one embodiment. According to this approach, the rotation matrix R in Equation 10 can be denoted as:

$$R = \begin{pmatrix} r_{11} & r_{12} & r_{13} \\ r_{21} & r_{22} & r_{23} \\ r_{31} & r_{32} & r_{33} \end{pmatrix} \tag{14}$$

where each r is an element of the matrix R.

It is often convenient to determine the α, β and γ parameters directly from a given rotation matrix R. The roll, in one embodiment, may be estimated by the following equation (e.g. when $r_{33}$ is not equal to zero):

$$\gamma = a \tan 2(r_{32}, r_{33}) \tag{15}$$

Similarly, in another approach the pitch may be estimated by the following equation:

$$\beta = a \tan 2(-r_{31}, \sqrt{r_{11}^2 + r_{21}^2}) \tag{16}$$

In still more approaches, the yaw may be estimated by the following equation (e.g. when $r_{11}$ is nonzero)

$$\alpha = a \tan 2(r_{21}, r_{11}) \tag{17}$$

Notably, in some approaches when $r_{11}$, $r_{33}$ or $\sqrt{r_{11}^2 + r_{21}^2}$ are near in value to zero (e.g. $0 < r_{11} < \varepsilon$, $0 < r_{33} < \varepsilon$, or $0 < \sqrt{r_{11}^2 + r_{21}^2} < \varepsilon$, where the value E is set to a reasonable value for considering the numerical stability, such as $0 < \varepsilon \leq 0.01$, in one embodiment, and c=0.0001 in a particularly preferred embodiment. In general, the value of c may be determined in whole or in part based on limited computer word length, etc. as would be understood by one having ordinary skill in the art upon reading the present descriptions), this corresponds to the degenerate of rotation matrix R, special formulae are used to estimate the values of yaw, pitch and roll.

Estimating Distance Between Object and Capture Device

In still more embodiments, it is possible to estimate the distance between an object and a capture device even without the knowledge of the object size, using information such as a camera's intrinsic parameters (e.g. focal length, scale factors of (u, v) in image plane).

The requirements of this algorithm, in one approach, may be summarized as follows: 1) The camera's focal length for the captured image can be provided and accessed by an API call of the device (for instance, an android device provides an API call to get focal length information for the captured image); 2) The scale factors of dx and dy are estimated by the algorithm in the equations 12.1 and 12.2.

This enables estimation of the scale factors dx, dy for a particular type of device, and does not require estimating scale factors for each device individually. For instance, in one exemplary embodiment utilizing an Apple iPhone® 4 smartphone, it is possible, using the algorithm presented above, to estimate the scale factors using an object with a known size. The two scaling factors may thereafter be assumed to be identical for the same device type.

The algorithm to estimate object distance to camera, according to one illustrative approach, is described as follows: normalize (u, v), (X, Y) in the equation below $$\lambda \begin{pmatrix} u \\ v \\ 1 \end{pmatrix} = H \begin{pmatrix} X \\ Y \\ 1 \end{pmatrix} \quad (18)$$

Note that Equation 18 is equivalent to Equation 1, except (u, v) in Equation 18 replaces the (x, y) term in Equation 1.

Suppose that $\tilde{u}=u/L_u$, $\tilde{v}=v/L_v$; $\tilde{x}=X/L_X$; $\tilde{y}=Y/L_Y$; where $L_u$, $L_v$ are image size in coordinates u and v and $L_X$, $L_Y$ are the object size to be determined.

Then Equation 18 may be expressed as:

$$\lambda \begin{pmatrix} \tilde{u} \\ \tilde{v} \\ 1 \end{pmatrix} = \tilde{H} \begin{pmatrix} \tilde{x} \\ \tilde{y} \\ 1 \end{pmatrix}, \quad (19)$$

where $$\tilde{H} = \begin{pmatrix} 1/L_u & & \\ & 1/L_v & \\ & & 1 \end{pmatrix} H \begin{pmatrix} L_x & & \\ & L_y & \\ & & 1 \end{pmatrix} \quad (20)$$

Normalized homography matrix $\tilde{H}$ can be estimated by equation (20). Note that from equation 11, the following may be determined:

$$H = \sigma A(r_1 r_2 t) \quad (21)$$

and the intrinsic parameter matrix of the camera is assumed with the following simple form:

$$A = \begin{pmatrix} f/dx & c & d \\ & f/dy & e \\ & & 1 \end{pmatrix} \quad (22)$$

where f is the camera focal length, dx, dy are scaling factors of the camera, which are estimated.

From equations (19), (20) and (21), thus:

$$\sigma A(r_1 \ r_2 \ t) \begin{pmatrix} L_x & & \\ & L_y & \\ & & 1 \end{pmatrix} = \tilde{\tilde{H}} \quad (23)$$

where $\tilde{\tilde{H}} = \begin{pmatrix} L_u & & \\ & L_v & \\ & & 1 \end{pmatrix} \tilde{H}$ Because A is known, from equation (23) the following may be determined:

$$\sigma(r_1 \ r_2 \ t) \begin{pmatrix} L_x & & \\ & L_y & \\ & & 1 \end{pmatrix} = A^{-1} \tilde{\tilde{H}} \quad (24)$$

Denote $K = A^{-1} \tilde{\tilde{H}}$, $K = (k_1, k_2, k_3)$, from equation (24) the following may be determined:

$$\sigma r_1 L_x = k_1 \quad (25)$$

$$\sigma r_2 L_y = k_2 \quad (26)$$

$$\sigma t = k_3 \quad (27)$$

because t in equation (27) is the translation vector of the object relative to camera. The L2 norm (Euclidean norm) of t is as follows:

$$\|t\| = \|k_3\|/\sigma \quad (28)$$

is the distance of left-top corner of the object to the camera.

Because $\|r_1\| = \|r_2\| = 1$, from equation (8) and (9), the following may be determined $$L_x = \|k_1\|/\sigma \quad (29)$$

$$L_y = \|k_2\|/\sigma \quad (30)$$

Equations (29) and (30) may be used to estimate the document size along X and Y coordinates. The scaling factor may remain unknown, using this approach.

Note that the algorithm to estimate rotation matrix described above does not need the scaling factor σ. Rather, in some approaches it is suitable to assume σ=1. In such cases, it is possible to estimate roll, pitch, and yaw with the algorithm presented above. Equations (29) and (30) may also be used to estimate the aspect ratio of the object as:

$$\text{aspectratio} = L_x/L_y = \|k_1\|/\|k_2\| \quad (31)$$

Estimation of Pitch and Roll from Assumed Rectangle.

In practice the most common case is the camera capture of rectangular documents, such as sheets of paper of standard sizes, business cards, driver and other licenses, etc. Since the focal distance of the camera does not change, and since the knowledge of the yaw is irrelevant for the discussed types of document image processing, it is necessary only to determine roll and pitch of the camera relative to the plane of the document in order to rectangularize the corresponding image of the document.

The idea of the algorithm is simply that one can calculate the object coordinates of the document corresponding to the tetragon found in the picture (up to scale, rotation, and shift) for any relative pitch-roll combination. This calculated tetragon in object coordinates is characterized by 90-degree angles when the correct values of pitch and roll are used, and the deviation can be characterized by the sum of squares of the four angle differences. This criterion is useful because it is smooth and effectively penalizes individual large deviations.

A gradient descent procedure based on this criterion can find a good pitch-roll pair in a matter of milliseconds. This has been experimentally verified for instances where the tetragon in the picture was correctly determined. This approach uses yaw equal zero and an arbitrary fixed value of the distance to the object because changes in these values only add an additional orthogonal transform of the object coordinates. The approach also uses the known focal distance of the camera in the calculations of the coordinate transform, but if all four corners have been found and there are three independent angles, then the same criterion and a slightly more complex gradient descent procedure can be used to estimate the focal distance in addition to pitch and roll—this may be useful for server-based processing, when incoming pictures may or may not have any information about what camera they were taken with.

Interestingly, when the page detection is wrong, even the optimal pitch-roll pair leaves sizeable residual angle errors (of 1 degree or more), or, at least, if the page was just cropped-in parallel to itself, the aspect ratio derived from the found object coordinates does not match the real one.

Additionally, it is possible to apply this algorithm even when a location of one of the detected sides of the document is suspect or missing entirely (e.g. that side of the document is partially or completely obstructed, not depicted, or is blurred beyond recognition, etc.). In order to accomplish the desired result it is useful to modify the above defined criterion to use only two angles, for example those adjacent to the bottom side, in a gradient descent procedure. In this manner, the algorithm may still be utilized to estimate pitch and roll from a picture tetragon with bogus and/or undetectable top-left and top-right corners.

In one example, arbitrary points on the left and right sides closer to the top of the image frame can be designated as top-left and top-right corners. The best estimated pitch-roll will create equally bogus top-left and top-right corners in the object coordinates, but the document will still be correctly rectangularized. The direction of a missing (e.g. top) side of the document can be reconstructed since it should be substantially parallel to the opposite (e.g. bottom) side, and orthogonal to adjacent (e.g. left and/or right) side(s).

The remaining question is where to place the missing side in the context of the image as a whole, and if the aspect ratio is known then the offset of the missing side can be nicely estimated, and if not, then it can be pushed to the edge of the frame, just not to lose any data. This variation of the algorithm can resolve an important user case when the picture contains only a part of the document along one of its sides, for example, the bottom of an invoice containing a deposit slip. In a situation like this the bottom, left and right sides of the document can be correctly determined and used to estimate pitch and roll; these angles together with the focal distance can be used to rectangularize the visible part of the document.

In more approaches, the foregoing techniques for addressing missing, obscured, etc. edges in the image data may additionally and/or alternatively employ a relaxed cropping and subsequent use of conventional edge detection as described above with reference to FIG. 5. Of course, if the edge is completely missing from the image and/or video data, then the relaxed cropping techniques may not be suitable to locate the edges and projection as described above may be the sole suitable mechanism for estimating the location of edges. However, in the context of the present disclosures, using internally represented content rather than corner or edge positions as key points allows projection of edge locations in a broader range of applications, and in a more robust manner than conventional edge detection.

As described herein, according to one embodiment a method 800 for reconstructing objects depicted in digital images based on internal features of the object includes operations as depicted in FIG. 8. As will be understood by a person having ordinary skill in the art upon reading the present descriptions, the method 800 may be performed in any suitable environment, including those depicted in FIGS. 1-2 and may operate on inputs and/or produce outputs as depicted in FIGS. 3A-5, in various approaches.

As shown in FIG. 8, method 800 includes operation 802, in which a plurality of identifying features of the object are detected. Notably, the identifying features are located internally with respect to the object, such that each identifying feature is, corresponds to, or represents a part of the object other than object edges, boundaries between the object and image background, or other equivalent transition between the object and image background. In this manner, and according to various embodiments the presently disclosed inventive image reconstruction techniques are based exclusively on the content of the object, and/or are performed exclusive of traditional edge detection, border detection, or other similar conventional recognition techniques known in the art.

The method 800 also includes operation 804, where the digital image of the object is reconstructed within a three dimensional coordinate space based at least in part on some or all of the plurality of identifying features. In various embodiments, the portion of the image depicting the object may be reconstructed, or the entire image may be reconstructed, based on identifying feature(s)

Of course, the method 800 may include any number of additional and/or alternative features as described herein in any suitable combination, permutation, selection thereof as would be appreciated by a skilled artisan as suitable for performing content-based object detection, upon reading the instant disclosures.

For instance, in one embodiment, method 800 may additionally or alternatively include reconstructing the digital image of the object based on transforming the object to represent dimensions of the object as viewed from an angle normal to the object. As such, reconstruction effectively corrects perspective distortions, skew, warping or "fishbowl" effects, and other artifacts common to images captured using cameras and mobile devices.

Optionally, in one embodiment reconstructing the digital image of the object is based on four of the plurality of identifying features, and employs a four-point algorithm as described in further detail elsewhere herein. In such embodiments, preferably the four of the plurality of identifying features are randomly selected from among the plurality of identifying features. In some approaches, and as described in greater detail below, reconstruction may involve an iterative process whereby multiple sets of four or more randomly selected identifying features are used to, e.g. iteratively, estimate transform parameters and reconstruct the digital image. Accordingly, reconstructing the digital image of the object may be based at least in part on applying a four-point algorithm to at least some of the plurality of identifying features of the object, in certain aspects.

Reconstructing the digital image of the object may additionally and/or alternatively involve estimating a homography transform H. In one approach, estimating H comprises detecting one or more point correspondences $p_i \leftrightarrow P_i'$ with $p_i=(x_i, y_i, 1)^T$ as discussed above. Optionally, but preferably, each point correspondence $p_i \leftrightarrow P_i'$ corresponds to a position $p_i$ of one of the plurality of identifying features of the object, and a respective position $P_i'$ of a corresponding identifying feature of the reconstructed digital image of the object. Estimating H may also include normalizing coordinates of some or all of the point correspondences.

As noted above, estimating the homography transform H may include an iterative process. In such embodiments, each iteration of the iterative process preferably includes: randomly selecting four key points; using a four point algorithm to estimate an $i^{th}$ homography transform $H_i$ based on the four key points; and applying the estimated $i^{th}$ homography transform $H_i$ to a set of corresponding key points. Each key point corresponds to one of the plurality of identifying features of the object, and in some embodiments may be one of the plurality of identifying features of the object. The set of corresponding key points preferably is in the form of a plurality of point correspondences, each point correspondence including: a key point other than the four randomly selected key points; and a corresponding key point from a reference image corresponding to the digital image. The "other" key points also correspond to one of the plurality of identifying features of the object. Thus, each point correspondence includes two key points in preferred embodiments: a key point from the test image and a corresponding key point from the reference image. The degree of correspondence between point correspondences may reflect the fitness of the homography transform, in some approaches.

Thus, in some approaches method 800 may include evaluating fitness of the homography transform (or multiple homography transforms generated in multiple iterations of the aforementioned process). The evaluation may include determining one or more outlier key points from among each set of corresponding key points; identifying, from among all sets of corresponding key points, the set of corresponding key points having a lowest number of outlier key points; defining a set of inlier key points from among the set of corresponding key points having the lowest number of outlier key points; and estimating the homography transform H based on the set of inlier key points. Preferably, the set of inlier key points exclude the outlier key points determined for the respective set of corresponding key points.

Furthermore, determining the one or more outlier key points from among each set of corresponding key points may involve: determining whether each of the plurality of point correspondences fits a transformation model corresponding to the estimated $i^{th}$ homography transform $H_i$; and, for each of the plurality of point correspondences, either: designating the other key point of the point correspondence as an outlier key point in response to determining the point correspondence does not fit the transformation model; or designating the other key point of the point correspondence as an inlier key point in response to determining the point correspondence does fit the transformation model.

In several approaches, particularly preferred in the case of objects such as documents and especially standard documents such as forms, templates, identification documents, financial documents, medical documents, insurance documents, etc. as would be understood by a skilled artisan upon reading the instant descriptions, the plurality of identifying features correspond to boilerplate content of the object. In various approaches, boilerplate content may include any type of such content as described hereinabove.

Notably, employing reconstruction as set forth herein, particularly with respect to method 800, carries the advantage of being able to reconstruct objects and/or images where at least one edge of the object is either obscured or missing from the digital image. Thus, the presently disclosed inventive concepts represent an improvement to image processing machines and the image processing field since conventional image recognition and image processing/correction techniques are based on detecting the edges of objects and making appropriate corrections based on characteristics of the object and/or object edges (e.g. location within image, dimensions such as particularly aspect ratio, curvature, length, etc.). In image data where edges are missing, obscured, or otherwise not represented at least in part, such conventional techniques lack the requisite input information to perform the intended image processing/correction. It should be understood that similar advantages are conveyed in the context of image recognition and method 700, which enables recognition of objects even where all edges of the object may be missing or obscured in the digital image data since recognition is based on features internal to the object.

In more embodiments, method 800 may include cropping the reconstructed digital image of the object based at least in part on a projected location of one or more edges of the object within the reconstructed digital image. The projected location of the one or more edges of the object is preferably based at least in part on an estimated homography transform H.

In still more embodiments, method 800 may include classifying the reconstructed digital image of the object. As described in further detail elsewhere herein, classification may operate as a type of orthogonal validation procedure or confidence measure for determining whether image recognition and/or reconstruction was performed correctly by implementing the techniques described herein. In brief, if a reconstructed image of an object is classified and results in a determination that the object depicted in the reconstructed image is a same type of object represented in/by the reference image used to reconstruct the object, then it is likely the reconstruction was performed correctly, or at least optimally under the circumstances of the image data.

The foregoing descriptions of methods 700 and 800 should be understood as provided by way of example to illustrate the inventive concepts disclosed herein, without limitation. In other approaches, the techniques disclosed herein may be implemented as a system, e.g. a processor and logic configured to cause the processor to perform operations as set forth with respect to methods 700 and/or 800, as well as a computer program product, e.g. a computer readable medium having stored thereon computer readable program instructions configured to cause a processor, upon execution thereof, to perform operations as set forth with respect to methods 700 and/or 800. Any of the foregoing embodiments may be employed without departing from the scope of the instant descriptions.

In addition, it should be understood that in various approaches it is advantageous to combine features, operations, techniques, etc. disclosed individually with respect to content based detection and content based recognition as described herein. Accordingly, the foregoing exemplary embodiments and descriptions should be understood as modular, and may be combined in any suitable permutation, combination, selection, etc. as would be understood by a person having ordinary skill in the art reading the present disclosure. In particular, leveraging a four-point algorithm and estimating homography transforms to facilitate content-based recognition and content-based reconstruction of image data are especially advantageous in preferred embodiments.

While various embodiments have been described above, it should be understood that they have been presented by way of example only, and not limitation. Thus, the breadth and scope of an embodiment of the present invention should not be limited by any of the above-described exemplary embodiments.

What is claimed is:

1. A computer program product for reconstructing an object depicted in a digital image, comprising a non-transitory computer readable medium having stored thereon computer readable program instructions configured to cause a hardware processor, upon execution thereof, to:
   detect, within the digital image, a plurality of identifying features of the object, wherein the plurality of identifying features are located internally with respect to the object; and
   reconstruct the digital image of the object within a three dimensional coordinate space based at least in part on some or all of the plurality of identifying features, wherein reconstructing the digital image of the object comprises estimating a homography transform H;
   determine one or more outlier key points from among a set of key points, each key point corresponding to one of the plurality of identifying features of the object;
   identify, from among each set of corresponding key points, the set of corresponding key points having a lowest number of outlier key points;
   define a set of inlier key points from among the set of corresponding key points having the lowest number of outlier key points, the set of inlier key points excluding the outlier key points determined from among the set of corresponding key points having the lowest number of outlier key points; and
   estimate the homography transform H based on the set of inlier key points.

2. The computer program product as recited in claim 1, wherein reconstructing the digital image of the object comprises transforming the object to represent dimensions of the object as viewed from an angle normal to the object.

3. The computer program product as recited in claim 1, wherein reconstructing the digital image of the object is based on four of the plurality of identifying features; and
   wherein the four of the plurality of identifying features are randomly selected from among the plurality of identifying features.

4. The computer program product as recited in claim 1, wherein reconstructing the digital image of the object is based at least in part on applying a four-point algorithm to at least some of the plurality of identifying features.

5. The computer program product as recited in claim 1, wherein estimating H comprises detecting one or more point correspondences $p_i \leftrightarrow P_i'$ with $p_i = (x_i, Y_i, 1)^T$.

6. The computer program product as recited in claim 5, wherein each point correspondence $p_i \leftrightarrow P_i'$ corresponds to a position $p_i$ of one of the plurality of identifying features of the object, and a respective position $P_i'$ of a corresponding identifying feature of the reconstructed digital image of the object.

7. The computer program product as recited in claim 5, wherein estimating H comprises normalizing coordinates of some or all of the point correspondences.

8. The computer program product as recited in claim 1, wherein estimating the homography transform H comprises an iterative process;
   wherein each iteration of the iterative process comprises:
      randomly selecting, from among the set of key points, four key points
      using a four point algorithm to estimate an $i^{th}$ homography transform $H_i$ based on the four key points; and
      applying the estimated $i^{th}$ homography transform to a set of corresponding key points,
   wherein the set of corresponding key points comprises a plurality of point correspondences, each point correspondence including:
      an other key point corresponding to one of the plurality of identifying features of the object; and
      a corresponding key point from a reference image corresponding to the digital image.

9. The computer program product as recited in claim 8, wherein determining the one or more outlier key points from among each set of corresponding key points comprises:
   determining whether each of the plurality of point correspondences fits a transformation model corresponding to the estimated $i^{th}$ homography transform $H_i$; and, for each of the plurality of point correspondences, either:
   designating the other key point of the point correspondence as an outlier key point in response to determining the point correspondence does not fit the transformation model; or
   designating the other key point of the point correspondence as an inlier key point in response to determining the point correspondence does fit the transformation model.

10. The computer program product as recited in claim 1, wherein the plurality of identifying features correspond to boilerplate content of the object.

11. The computer program product as recited in claim 1, wherein at least one edge of the object is either obscured or missing from the digital image.

12. The computer program product as recited in claim 1, comprising cropping the reconstructed digital image of the object based at least in part on a projected location of one or more edges of the object within the reconstructed digital image.

13. The computer program product as recited in claim 12, wherein the projected location of the one or more edges of the object is based at least in part on an estimated homography transform H.

14. The computer program product as recited in claim 1, comprising classifying the reconstructed digital image of the object.

* * * * *